US011975527B2

(12) United States Patent
Müller et al.

(10) Patent No.: US 11,975,527 B2
(45) **Date of Patent: *May 7, 2024**

(54) SHEET-FED PRINTING UNIT CONFIGURED AS A SCREEN PRINTING UNIT AND COMPRISING TWO BASE MODULES

(71) Applicant: KOENIG & BAUER AG, Würzburg (DE)

(72) Inventors: Michael Müller, Karlstadt (DE); Martin Palme, Kist (DE); Emmanuel Thony, Rennaz (DE)

(73) Assignee: KOENIG & BAUER AG, Würzburg (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/265,272

(22) PCT Filed: Feb. 15, 2022

(86) PCT No.: PCT/EP2022/053579
§ 371 (c)(1),
(2) Date: Jun. 5, 2023

(87) PCT Pub. No.: WO2022/189100
PCT Pub. Date: Sep. 15, 2022

(65) Prior Publication Data

US 2023/0391066 A1 Dec. 7, 2023

(30) Foreign Application Priority Data

Mar. 9, 2021 (DE) ..................... 10 2021 105 640.3

(51) Int. Cl.
*B41F 21/10* (2006.01)
*B41F 15/08* (2006.01)
(Continued)

(52) U.S. Cl.
CPC .......... *B41F 15/0809* (2013.01); *B41F 15/38* (2013.01); *B41F 21/102* (2013.01)

(58) Field of Classification Search
None
See application file for complete search history.

(56) References Cited

U.S. PATENT DOCUMENTS

| | | | |
|---|---|---|---|
| 4,693,179 | A | 9/1987 | Watts |
| 2011/0017081 | A1 | 1/2011 | Gygi |

(Continued)

FOREIGN PATENT DOCUMENTS

| | | | |
|---|---|---|---|
| DE | 102015208916 A1 | 11/2016 | |
| DE | 102018205882 A1 | 10/2019 | |

(Continued)

OTHER PUBLICATIONS

International Search Report PCT/EP2022/053579 dated Jun. 3, 2022.

*Primary Examiner* — Leslie J Evanisko
(74) *Attorney, Agent, or Firm* — MATTINGLY & MALUR, PC

(57) ABSTRACT

In some examples, a screen printing unit includes a screen printing forme cylinder, an impression cylinder, and a frame including two frame side walls. The screen printing unit further includes first and second base modules, each comprising two stationary base side walls that each have a one-piece design. Each base module includes four installation areas for rotational transport bodies whose positions coincide in the base modules, and the respective first and second installation areas of each base module form a respective selection group of the base module. An impression cylinder cooperating with the screen printing forme cylinder is in one of the installation areas of the selection group of the first base module, and a respective rotational transport body is arranged in each of the four installation areas of the base (Continued)

modules. A functionally different rotational transport body is arranged in an installation area of the first base module.

12 Claims, 17 Drawing Sheets

(51) Int. Cl.
*B41F 15/10* (2006.01)
*B41F 15/38* (2006.01)

(56) References Cited

U.S. PATENT DOCUMENTS

| | | | |
|---|---|---|---|
| 2015/0075396 A1 | 3/2015 | Kusaka | |
| 2017/0341366 A1 | 11/2017 | Sakata | |
| 2018/0215136 A1 | 8/2018 | Schaede et al. | |

FOREIGN PATENT DOCUMENTS

| | | | | |
|---|---|---|---|---|
| DE | 102018212429 A1 | | 1/2020 | |
| DE | 102018122146 A1 | | 3/2020 | |
| DE | 102018122147 A1 | | 3/2020 | |
| EP | 0723864 A1 | | 7/1996 | |
| EP | 1717028 A2 | * | 11/2006 | .......... B41F 15/0809 |
| JP | 2001225444 A | * | 8/2001 | |
| WO | 2020/020507 A1 | | 1/2020 | |
| WO | 2020/052935 A1 | | 3/2020 | |
| WO | 2021004696 A1 | | 1/2021 | |

* cited by examiner

SHEET-FED PRINTING UNIT CONFIGURED AS A SCREEN PRINTING UNIT AND COMPRISING TWO BASE MODULES

CROSS-REFERENCES TO RELATED APPLICATIONS

This application is the US national phase, under 35 USC § 371, of PCT/EP2022/053579, filed on Feb. 15, 2022, published as WO 2022/189100 A1 on Sep. 15, 2022, and claiming priority to DE 10 2021 105 640.3, filed Mar. 9, 2021, and all of which are expressly incorporated by reference herein in their entireties.

TECHNICAL FIELD

The invention relates to a sheet-fed printing unit configured as a screen printing unit and comprising two base modules.

BACKGROUND

A sheet-fed printing unit configured as a screen printing unit is known from DE 10 2018 122 146 A1 and DE 10 2018 122 147 A1, respectively.

A sheet-fed printing unit is known from US 2017/0 341 366 A1, in which a screen printing forme cylinder can be thrown off an impression cylinder by means of a throw-off device.

A sheet-fed printing unit comprising a screen printing forme cylinder, an impression cylinder and an alignment cylinder is known from DE 10 2018 212 429 A1, wherein a drying unit is arranged so as to be directed at a transport angle of the alignment cylinder. An inspection device that is directed at a roller is disclosed.

A sheet-fed printing unit comprising a screen printing forme cylinder, an impression cylinder, an alignment cylinder and a UV LED drying unit is known from US 2018/0 215 136 A1.

A sheet-fed printing unit comprising screen printing forme cylinders, impression cylinders configured as alignment cylinders, and a UV drying unit is known from US 2011/0 017 081 A1. Additional magnetic elements can be arranged on other cylinders.

A screen printing unit comprising a screen printing forme cylinder and an impression cylinder is known from EP 0 723 864 A1, the fixing element of which comprises an inner and an outer contact surface for clamping sheets, this inner contact surface being arranged at a distance from an axis of rotation of the impression cylinder which corresponds to a base radius, and a cylinder barrel of the impression cylinder comprising a supporting surface for sheets, which comprises at least one impression portion having a constant barrel radius, and the barrel radius being larger than the base radius.

A sheet-fed printing machine comprising screen printing forme cylinders is known in each case from DE 10 2018 205 882 A1, U.S. Pat. No. 4,693,179 A, WO 2020/020507 A1 and DE 10 2015 208 916 A1.

A printing press comprising two screen printing units is known from WO 2020/052935 A1. Each screen printing unit comprises an impression cylinder as well as a feeding sheet transfer cylinder and removing sheet transfer cylinder.

A sheet-fed printing press, which can also comprise screen printing mechanisms, is known from WO2021/04696 A1.

A screen printing press is known from US 2015/0075396 A1.

SUMMARY

It is an object of some examples herein to provide a sheet-fed printing unit configured as a screen printing unit and comprising two base modules.

The object is achieved according to some examples by a screen printing unit includes a screen printing forme cylinder, an impression cylinder, and a frame including two frame side walls. The screen printing unit further includes first and second base modules, each comprising two stationary base side walls that each have a one-piece design. Each base module includes four installation areas for rotational transport bodies whose positions coincide in the base modules, and the respective first and second installation areas of each base module form a respective selection group of the base module. An impression cylinder cooperating with the screen printing forme cylinder is in one of the installation areas of the selection group of the first base module, and a respective rotational transport body is arranged in each of the four installation areas of the base modules. A functionally different rotational transport body is arranged in an installation area of the first base module.

A sheet-fed printing unit configured as a screen printing unit, which comprises at least one screen printing forme cylinder and at least one impression cylinder cooperating therewith, wherein a cylinder barrel of the impression cylinder preferably has a supporting surface for sheets, which comprises at least one impression portion having a constant barrel radius that extends over an angle of at least 170° about the axis of rotation of the impression cylinder, and wherein the screen printing forme cylinder preferably has an effective screen radius that is smaller than the barrel radius, and larger than half the barrel radius, has the advantage that the effective screen radius can be kept relatively small. The barrel of the impression cylinder preferably includes a relatively large duct, which requires space around the circumference. The circumference of the impression cylinder therefore has to be configured to be accordingly large. If the screen printing forme cylinder had an identically sized effective circumference, the cylindrical screen arranged thereon would potentially become unstable. The ratio of the radii makes a relatively small effective screen radius possible.

In an alternative or additional refinement, the sheet-fed printing unit is preferably characterized in that the screen printing unit comprises at least one further rotational transport body forming, together with the impression cylinder, a transfer point, in particular for sheets, and that a fixing element, provided in particular for holding sheets, of the at least one further rotational transport body has an inner contact surface and an outer contact surface, which are arranged so as to cooperate for clamping sheets, and that this inner contact surface is at least partially located at a distance from an axis of rotation of this further rotational transport body which corresponds to a base radius, and that the effective screen radius is smaller than the base radius, and that the effective screen radius is larger than half the base radius.

This means that the effective screen radius of the screen printing forme cylinder is also smaller than a base radius that is used for transport elements. This likewise offers the advantage that stable cylindrical screens can be used.

In an alternative or additional refinement, the sheet-fed printing unit is preferably characterized in that a fixing element of the impression cylinder, which is in particular provided for holding sheets, has an inner contact surface and an outer contact surface, which are arranged so as to cooperate for clamping sheets, and that this inner contact surface is at least partially located at a distance from an axis of rotation of the impression cylinder which corresponds to a base radius, and that the barrel radius is larger than the base radius. This offers the advantage that the cylindrical screen is not damaged by the grippers in the region of a screen printing nip, and the transfer of the sheets between the impression cylinder and the further rotational transport body nonetheless takes place with great precision since all grippers of the involved rotational transport bodies rotate at the same circumferential speed.

In an alternative or additional refinement, the sheet-fed printing unit is preferably characterized in that the screen printing unit comprises a forme cylinder drive driving the screen printing forme cylinder, which differs from any drive by means of which the impression cylinder cooperating with the screen printing forme cylinder can be driven. In this way, it can be ensured, despite the differing circumferences of these two cylinders, that these rotate at an identical angular velocity. This is accomplished in particular when the impression cylinder has a smaller radius at least in the region of a cylinder channel than in the region of the cylinder barrel.

In an alternative or additional refinement, the sheet-fed printing unit is preferably characterized in that at least one further rotational transport body forming, together with the impression cylinder, a transfer point, in particular for sheets, is configured as a blower drum arranged along a transport path provided for a transport of sheets, downstream from the impression cylinder, and/or that at least one further rotational transport body forming, together with the impression cylinder, a transfer point, in particular for sheets, is configured as a transfer drum arranged along a transport path provided for a transport of sheets, upstream from the impression cylinder. In this way, smearing of a print image that has not yet dried can preferably be prevented.

A method for operating a sheet-fed printing unit configured as a screen printing unit is preferred, wherein, during a sequence of several consecutive printing processes and respective interposed adjustment processes, an impression portion of a supporting surface of a cylinder barrel of an impression cylinder continuously rotates at a constant circumferential speed about its axis of rotation, and wherein, during this sequence, a screen printing forme cylinder forming, together with the impression cylinder, a screen printing nip is periodically decelerated and accelerated. This enables the use of a relatively small effective screen radius.

A method for operating a sheet-fed printing unit configured as a screen printing unit is preferred, wherein a screen printing nip, in which sheets are consecutively printed, is formed together by a screen printing forme cylinder and an impression cylinder cooperating therewith, and wherein, during a respective printing process, a respective sheet is printed, while an impression portion of a supporting surface of a cylinder barrel of the impression cylinder passes the screen printing nip, and wherein a respective sheet, at least during its printing process, is held by means of at least one fixing element on the impression portion of the supporting surface of the impression cylinder, and in the process passes the screen printing nip at a first sheet speed, while the impression cylinder rotates at a first angular velocity, and wherein, during the respective printing process of the respective sheet, the screen printing forme cylinder rotates about its axis of rotation at a second angular velocity, which is different from the first angular velocity, and the portion of the screen printing forme cylinder that is in contact with the respective sheet rotates at a first circumferential speed about this axis of rotation of the screen printing forme cylinder which is identical to the first sheet speed, and wherein a respective adjustment process takes place in each case between two consecutive printing processes, during which the screen printing forme cylinder is not in contact with any sheet and the impression cylinder, and wherein, during the respective adjustment process, the impression cylinder rotates at the first angular velocity and the screen printing forme cylinder rotates at least intermittently at a third angular velocity, which is lower than the second angular velocity. This enables the use of the relatively small effective screen radius.

In an alternative or additional refinement, the method is preferably characterized in that an average angular velocity of the screen printing forme cylinder is identical to an average angular velocity of the impression cylinder cooperating therewith over a respective full process cycle, which lasts from the start of one printing process to the start of the next printing process, and that an average circumferential speed of the screen printing forme cylinder is lower than an average circumferential speed of the impression cylinder cooperating therewith over the same respective full process cycle.

In an alternative or additional refinement, the sheet-fed printing unit is preferably characterized in that the sheets, after their respective printing process, are transferred in particular indirectly to a succeeding rotational transport body of the sheet-fed printing unit, and thereafter are transported in a transport process at the first angular velocity about the axis of rotation of this subsequent rotational transport body, and that a circumferential speed at which the sheets are transported, during the respective transport process, about this axis of rotation is identical to a second sheet speed, which is lower than the first sheet speed. This likewise makes it possible to use the increased barrel radius to avoid damage to the cylindrical screen, while ensuring that the transfer through the entire screen printing unit is low-error and as reliable as possible.

The sheet-fed printing unit, which is configured as a screen printing unit and comprises at least one screen printing forme cylinder and at least one impression cylinder cooperating therewith, preferably comprises at least one further rotational transport body, wherein a fixing element, provided in particular for holding sheets, of the impression cylinder preferably has an inner contact surface and an outer contact surface, which are arranged so as to cooperate for clamping sheets, and wherein this inner contact surface is at least partially located at a distance from an axis of rotation of the impression cylinder which corresponds to a base radius, and wherein a cylinder barrel of the impression cylinder preferably has a supporting surface for sheets that includes at least one impression portion having a constant barrel radius, which extends over an angle of at least 170° about the axis of rotation of the impression cylinder, and wherein the barrel radius is preferably larger than the base radius, and wherein a fixing element, which is in particular provided for holding sheets, of the at least one further rotational transport body preferably has an inner contact surface and an outer contact surface, which are arranged so as to cooperate for clamping sheets, and wherein this inner contact surface is preferably at least partially located at a distance from an axis of rotation of this further rotational transport body which corresponds to the base radius. Such a sheet-fed printing unit in particular has the advantage that the transfer of sheets between the impression cylinder and further rotational transport bodies takes place with great precision since all grippers of the involved rotational transport bodies rotate at the same circumferential speed.

In an alternative or additional refinement, the sheet-fed printing unit is preferably characterized in that the further rotational transport body is configured as an alignment cylinder, which in the area of its outer circumference comprises a plurality of elements inducing a magnetic field. It is then possible to print a printing ink containing magnetically alignable particles on the sheet, and an alignment of accordingly precisely selectable parts of this printing ink in a manner that is true to register can be achieved by means of the alignment cylinder.

In an alternative or additional refinement, the sheet-fed printing unit is preferably characterized in that a blower drum is arranged so as to form a transfer point with the impression cylinder, and so as to form another transfer point with the alignment cylinder. This offers the advantage that the sheet can be transported between the impression cylinder and the alignment cylinder without smearing.

In an alternative or additional refinement, the sheet-fed printing unit is preferably characterized in that a fixing element, which is in particular provided for holding sheets, of the at least one further blower drum has an inner contact surface and an outer contact surface, which are arranged so as to cooperate for clamping sheets, and this inner contact surface is at least partially located at a distance from an axis of rotation of this blower drum which corresponds to a base radius, and/or that at least one sheet guide device and at least one sheet blower device are assigned to the blower drum, and the at least one sheet guide device has at least one inner surface, whose shape corresponds to a section of a cylinder shell having an axis that is identical to the axis of rotation of the blower drum, and this inner surface is located at a distance from the axis of rotation of the blower drum which is larger than the base radius and/or that the at least one sheet blower device is used to generate a flow of gas that is directed from the inside against the inner surface of this sheet guide device. The transfer from the impression cylinder to the alignment cylinder as a whole can then be carried out particularly precisely and without smearing.

In an alternative or additional refinement, the sheet-fed printing unit is preferably characterized in that at least one pre-alignment device is arranged, in particular in a stationary manner, in the region of the blower drum, which is an integral part of a respective alignment device and comprises at least one solenoid and/or permanent magnet. In this way, the sheet can be transported relatively quickly or along relatively short stretches since the pre-alignment shortens the necessary processes at the alignment cylinder.

In an alternative or additional refinement, the sheet-fed printing unit is preferably characterized in that the screen printing forme cylinder has an effective screen radius, and that the effective screen radius is smaller than the barrel radius and smaller than the base radius, and in particular that the effective screen radius is larger than half the barrel radius and larger than half the base radius.

In an alternative or additional refinement, the sheet-fed printing unit is preferably characterized in that a stationary frame of the screen printing unit has two frame side walls, and that the screen printing unit comprises at least one stationary base module, which has two base side walls located opposite one another, and that the base module defines four installation areas for rotational transport bodies, and that the impression cylinder is arranged in one of these four installation areas, and that the at least one further rotational transport body is arranged in one of these four installation areas. The arrangement of such a base module makes a screen printing unit possible that is cost-effective and easy to expand. In an alternative or additional refinement, the sheet-fed printing unit is preferably characterized in that a through-plane of the base module is defined as the plane that completely includes both an axis of rotation of the first rotational transport body of this base module and an axis of rotation of a fourth rotational transport body of this base module, and that the through-plane has a normal vector, which extends in the vertical direction. This results in an identical height for an entrance and an exit of the base module, which further simplifies the production and/or expansion of the screen printing unit.

A sheet-fed printing press comprising a screen printing unit configured as described above, which additionally comprises at least one further printing unit that is configured as a sheet simultaneous printing unit and/or that is configured as a sheet numbering printing unit and/or that is configured as a flexographic printing unit, wherein at least one fixing element, in particular provided for holding sheets, of at least one, and preferably of each, sheet transport cylinder of this at least one further printing unit has an inner contact surface and an outer contact surface, which are arranged so as to cooperate for clamping sheets, and wherein this inner contact surface is located at least partially at a distance from an axis of rotation of this sheet transport cylinder which corresponds to the base radius or an integer multiple of the base radius, and in particular twice the base radius, has the advantage that transfers from rotational transport body to rotational transport body overall can take place with great precision, and as a result particularly high levels of register accuracy are possible.

In an alternative or additional refinement, the sheet-fed printing unit, which is configured as a screen printing unit and comprises at least one screen printing forme cylinder forming, together with an impression cylinder, a screen printing nip, is preferably characterized in that along a transport path provided for a transport of sheets, downstream from the impression cylinder, at least one alignment cylinder is arranged, which in the region of its outer circumference comprises a plurality of elements that induce a magnetic field, wherein a transport angle of the alignment cylinder is the angular range about the axis of rotation of the alignment cylinder in which sheets are transported by means of the alignment cylinder, and wherein at least one drying device is arranged so as to be directed at the transport angle of the alignment cylinder, and wherein, viewed in the direction of rotation, downstream from the at least one drying device, at least one inspection device is arranged so as to be directed at the transport angle of the alignment cylinder. This allows a particularly compact and cost-effective design of the sheet-fed printing unit and makes an inspection possible with high precision since no transfer of sheets takes place between the alignment and inspection.

In an alternative or additional refinement, the sheet-fed printing unit is preferably characterized in that the impression cylinder forms a transfer point with a rotational transport body, and that this rotational transport body forms a further transfer point with the alignment cylinder. More preferably, this rotational transport body is configured as a blower drum. Still more preferably, a transport angle of the blower drum is the angular range about the axis of rotation of the blower drum in which sheets are transported by means of the blower drum, and a pre-alignment device is arranged in the region of the transport angle of the blower drum, which comprises at least one element inducing a magnetic field. The blower drum, in turn, allows transport without smearing, and the pre-alignment allows high precision at high productivity.

In an alternative or additional refinement, the sheet-fed printing unit is preferably characterized in that at least one stationary outer magnetic device, which is assigned to the alignment cylinder, is provided, and that the outer magnetic device extends over an exposure angle around the assigned alignment cylinder, and that the outer magnetic device, viewed in the direction of rotation, is arranged upstream from the at least one drying device so as to be directed at the transport angle of the alignment cylinder. This, for example, allows an even more precise alignment of the particles.

In an alternative or additional refinement, the sheet-fed printing unit is preferably characterized in that, viewed in the direction of rotation, a shading device is arranged between the at least one drying device and the at least one inspection device. The shading device is preferably used, proceeding from the drying device, to prevent radiation to as great an extent as possible from reaching any sensor device of the inspection device. The at least one inspection device is preferably configured as a reflective inspection device and/or comprises at least one radiation source, in particular a light source.

In an alternative or additional refinement, the sheet-fed printing unit is preferably characterized in that a stationary frame of the screen printing unit has two frame side walls, and that the screen printing unit comprises at least one stationary base module, which has two base side walls located opposite one another, and that the base module defines four installation areas for rotational transport bodies, and that a respective transport angle is assigned to each rotational transport body of the base module, and that a transport angle of the first rotational transport body of the base module is at least 190° and no more than 220°, and that a transport angle of the second rotational transport body is at least 220° and no more than 270°, and that a transport angle of the third rotational transport body is at least 220° and no more than 270°, and that a transport angle of the fourth rotational transport body of the base module is more than 100° and less than 150°. These transport angles make it possible to use standardized base modules, even if both the drying process and the inspection are to take place on the same alignment cylinder. The at least one drying device is preferably configured as a radiation dryer and/or as an UV dryer and/or as an LED dryer and/or as an UV LED dryer.

In an alternative or additional refinement, the sheet-fed printing unit is preferably characterized in that a delivery device is arranged along the transport path provided for the transport of sheets, downstream from the sheet-fed printing unit, and that at least one further drying device and/or curing device is arranged along a section of the transport path provided for the transport of sheets which is defined by the delivery device. It is then also possible for a relatively short exposure time for the drying process on the alignment cylinder to be tolerated since smearing is prevented. Above and below, the terms 'drying device' and 'curing device' shall be understood as synonyms.

The screen printing unit preferably comprises at least one screen printing forme cylinder and at least one impression cylinder cooperating therewith, wherein more preferably an effective screen radius is assigned to the screen printing forme cylinder, and a barrel radius is assigned to the impression cylinder. The screen printing unit preferably comprises at least one in particular stationary frame, which has at least two in particular stationary frame side walls located opposite one another in a transverse direction.

In an alternative or additional refinement, the screen printing unit preferably comprises at least one in particular first base module, which has two stationary base side walls that each have a one-piece design and are each an integral part of a respective frame side wall. The base side walls preferably each include a supporting wall, and more preferably at least one reinforcement. These two supporting walls preferably each define one of two inner wall planes, by which more preferably an inside width W of the respective base module is defined. The respective base module in each case preferably includes at least four, and more preferably exactly four, installation areas for rotational transport bodies, to which respective recesses in the supporting walls of the base side walls are assigned. Preferably, a respective rotational transport body is arranged in each of the at least four installation areas.

Preferably, the first installation area along a transport path provided for a transport of sheets and the second installation area of the respective base module along this transport path form a selection group. A first axis of rotation is assigned to the rotational transport body arranged in the first installation area. A second axis of rotation is assigned to the rotational transport body arranged in the second installation area. Preferably, in particular during printing operation or in a printing operation position, a rotational transport body configured as an impression cylinder is arranged in one of the two installation areas of the selection group, which, for example, is arranged so as to cooperate with in particular two other rotational transport bodies and with a screen printing forme cylinder. Preferably, in particular during printing operation or in the printing operation position, a rotational transport body is arranged in the other of the two installation areas of the selection group, which is not in contact with any screen printing forme cylinder.

A first screen axis is a straight line, which is oriented parallel to the transverse direction, and which is located at a first distance from the first axis of rotation and which is located at a second distance from the second axis of rotation. The first distance preferably corresponds to the sum of the effective screen radius and the barrel radius. The second distance is preferably larger than the sum of the effective screen radius and the barrel radius. The second distance is preferably larger than 2.5 times the barrel radius. The second distance is preferably smaller than 3.5 times, and more preferably than 3 times, the barrel radius. The first screen axis is a possible position of an axis of rotation of a screen printing forme cylinder. A second screen axis is a straight line, which is oriented parallel to the transverse direction A, and which is located at the second distance from the first axis of rotation and which is located at the first distance from the second axis of rotation. The second screen axis is an alternative possible position of an axis of rotation of a screen printing forme cylinder. The first screen axis and the second screen axis are located at a third distance from one another which is larger than 3 times, and preferably than 3.5 times, the barrel radius. A first screen axis area includes at least the first screen axis. The first screen axis area has either no intersecting point with a base side wall, or has only intersecting points with one or both base side walls which are located at least 2 cm, more preferably at least 5 cm, still more preferably at least 10 cm, and still more preferably at least 20 cm outside the spatial area bounded by the two inner wall planes. A second screen axis area includes at least the second screen axis. The second screen axis area has either no intersecting point with a base side wall, or has only intersecting points with one or both base side walls which are located at least 2 cm, more preferably at least 5 cm, still more preferably at least 10 cm, and still more preferably at least 20 cm outside the spatial area bounded by the two inner wall planes. In this way, the base module can be selectively equipped with an upper or a lower screen printing forme cylinder, i.e., be selectively set up for printing a front side or a rear side. The base side walls can nonetheless always be identically produced. This lowers costs and shortens a production time of the printing press or reduces the frames to be kept available for fast production and delivery.

In an alternative or additional refinement, the screen printing unit is preferably characterized in that the first screen axis area, proceeding from the first screen axis, extends in any direction that is orthogonal to the transverse direction over at least 1 cm, more preferably at least 2 cm, still more preferably at least 5 cm, and still more preferably at least 10 cm, and/or that the second screen axis area, proceeding from the second screen axis, extends in any direction that is orthogonal to the transverse direction over at least 1 cm, more preferably at least 2 cm, still more preferably at least 5 cm, and still more preferably at least 10 cm. This allows accordingly large devices to be installed, such as, for example, squeegee devices and/or forme cylinder drives.

In an alternative or additional refinement, the screen printing unit is preferably characterized in that a screen printing forme cylinder is arranged in a screen axis area of this particular base module, and no screen printing forme cylinder is arranged in the other screen axis area of this particular base module. In particular due to an increased barrel radius, the axes of rotation of the installation areas can thus nonetheless remain standardized since no impression cylinders are in direct contact with one another, but preferably only impression cylinders with transfer drums and/or suction drums and/or blower drums.

In an alternative or additional refinement, the screen printing unit is preferably characterized in that each screen axis area, with respect to a transport direction that is orthogonal to the transverse direction, is entirely arranged downstream from an entrance transfer point. This makes it easier to combine multiple base modules. In an alternative or additional refinement, the screen printing unit is preferably characterized in that one of the screen axis areas of the particular base module overlaps with at least one squeegee adjusting device, which is arranged outside the spatial area bounded by the two inner wall planes. In an alternative or additional refinement, the screen printing unit is preferably characterized in that the at least one squeegee adjusting device is arranged on a frame section that is pivotably arranged on the base side walls of this base module. The frame section is preferably arranged within the spatial area bounded by the two inner wall planes. The frame section is preferably arranged so as to support the screen printing forme cylinder via a forme cylinder mount. The frame section serves as a holder for the particular installed screen printing forme cylinder and the additional components required for operating the same. The frame section can preferably be backed away and thus, for example, facilitates a screen replacement.

The screen printing unit preferably comprises at least one screen printing forme cylinder and at least one impression cylinder cooperating therewith. The screen printing unit preferably comprises at least one in particular stationary frame, which has at least two in particular stationary frame side walls located opposite one another in a transverse direction. The screen printing unit preferably comprises at least one in particular first base module, which has two stationary base side walls that each have a one-piece design and are each an integral part of a respective frame side wall. The base side walls preferably each include a supporting wall, and more preferably at least one reinforcement.

In an alternative or additional refinement, the screen printing unit is preferably characterized by comprising at least one first base module and at least one second base module, each base module in each case comprising two stationary base side walls, which each have a one-piece design and are each an integral part of a respective frame side wall. The respective base module in each case preferably includes four installation areas for rotational transport bodies, to which more preferably respective recesses in the supporting walls of the base side walls are assigned. The relative position of the four installation areas of the first base module with respect to one another preferably coincides with the relative position of the four installation areas of the second base module. Preferably, the respective first installation area along a transport path provided for a transport of sheets and the respective second installation area of the respective base module along this transport path form a respective selection group of the respective base module. Preferably, an impression cylinder cooperating with a screen printing forme cylinder is arranged in exactly one of the installation areas of the selection group of the first base module.

Preferably, a respective rotational transport body is arranged in each of the at least four installation areas of the two base modules. This allows a screen printing unit to be composed of multiple base modules, and thereby lowers costs and shortens a production time of the printing press or reduces the number of frames to be kept available for fast production and delivery.

In an alternative or additional refinement, the screen printing unit is preferably characterized in that a functionally different rotational transport body is arranged in at least one installation area of the first base module than in a corresponding installation area, in terms of its installation position, of the second base module. This allows an adaptable design of the screen printing unit, despite the lower costs. For example, the sheet-fed printing unit is then characterized in that a functionally different rotational transport body is arranged in a first installation area, along this transport path, of the first base module than in a first installation area, along this transport path, of the second base module, and/or that a functionally different rotational transport body is arranged in a second installation area, along this transport path, of the first base module than in a second installation area, along this transport path, of the second base module, and/or that a functionally different rotational transport body is arranged in a third installation area, along this transport path, of the first base module than in a third installation area, along this transport path, of the second base module, and/or that a functionally different rotational transport body is arranged in a fourth installation area, along this transport path, of the first base module than in a fourth installation area, along this transport path, of the second base module.

In an alternative or additional refinement, the screen printing unit is preferably characterized in that an impression cylinder cooperating with a screen printing forme cylinder is arranged in exactly one of the installation areas of the selection group of the second base module. In an alternative or additional refinement, the screen printing unit is preferably characterized in that the impression cylinder arranged in the first base module is arranged in a first installation area of the first base module, and the impression cylinder arranged in the second base module is arranged in a first installation area of the second base module. In an alternative or additional refinement, the screen printing unit is preferably characterized in that the impression cylinder arranged in the first base module is arranged in a first installation area of the first base module, and the impression cylinder arranged in the second base module is arranged in a second installation area of the second base module.

In an alternative or additional refinement, the screen printing unit is preferably characterized in that an alignment cylinder is arranged in an installation area of the first base module, which in the region of its outer circumference comprises a plurality of elements that induce a magnetic field, and/or that an alignment cylinder is arranged in an installation area of the second base module, which in the region of its outer circumference comprises a plurality of elements that induce a magnetic field. In an alternative or additional refinement, the screen printing unit is preferably characterized in that a blower drum is arranged in an installation area of the first base module and/or that a blower drum is arranged in an installation area of the second base module. The use of a respective alignment cylinder enables printing with an alignable printing ink, and thus makes it possible to generate security elements, for example for security printing. The use of the blower drum enables transport without smearing, in particular prior to the corresponding alignment and drying or curing of the printing ink.

BRIEF DESCRIPTION OF THE DRAWINGS

Exemplary embodiments of the invention are illustrated in the drawings and will be described in greater detail below. The drawings show.

DETAILED DESCRIPTION

Figure 1A:
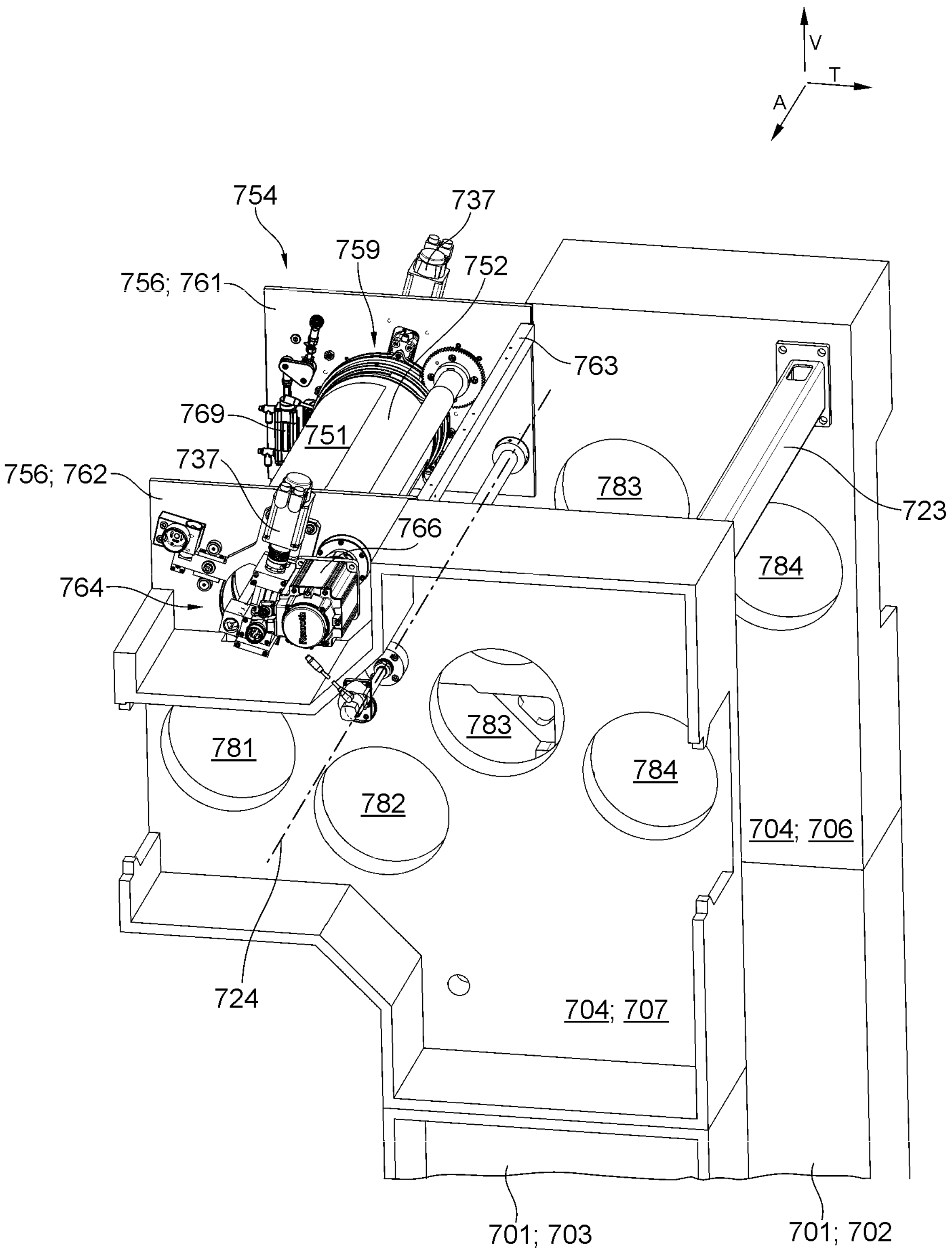
FIG. 1*a* a schematic illustration of an oblique view of a base module of a screen printing unit.
Figure 1B:
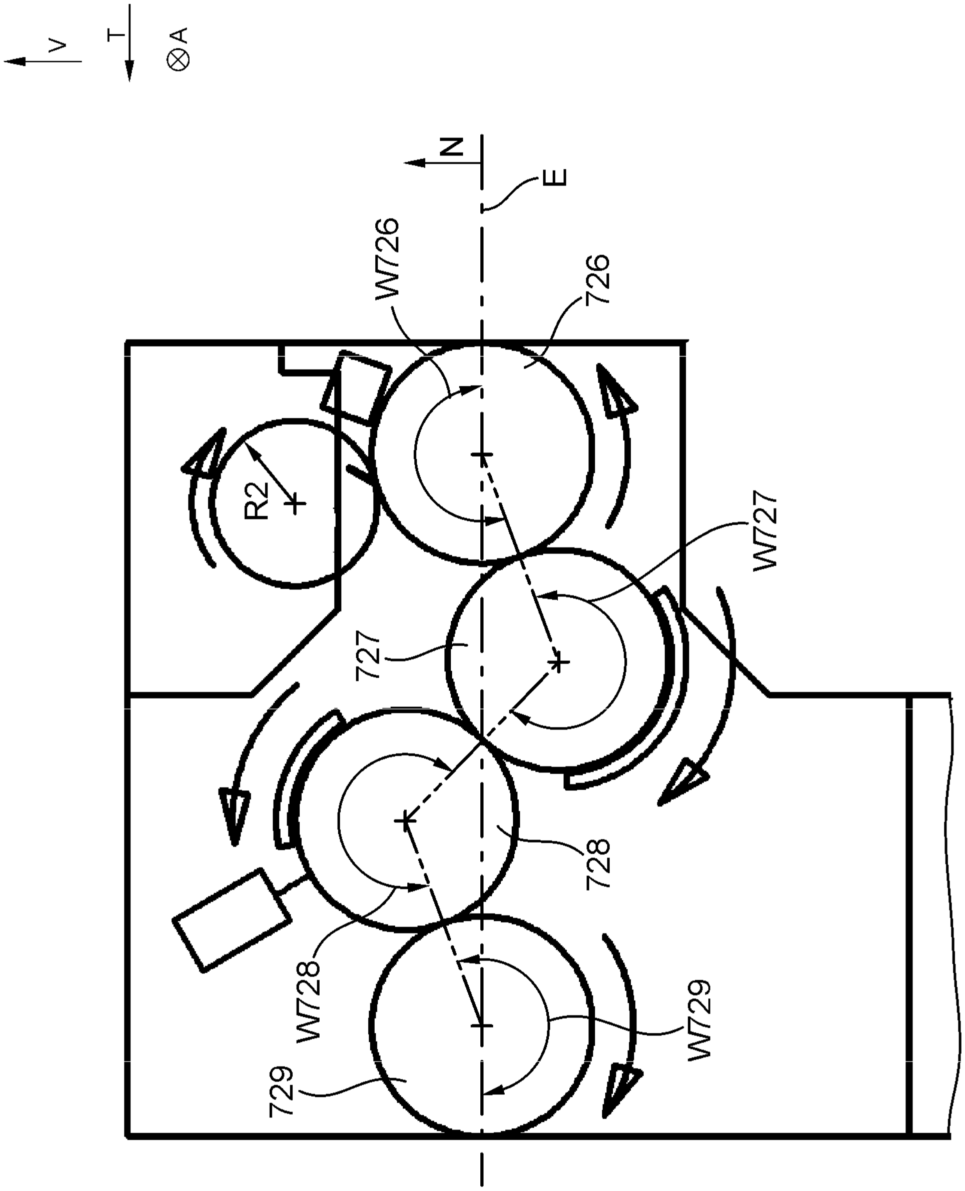
FIG. 1*b* a schematic illustration of installation areas of a base module according to FIG. 1*a;*
Figure 1C:
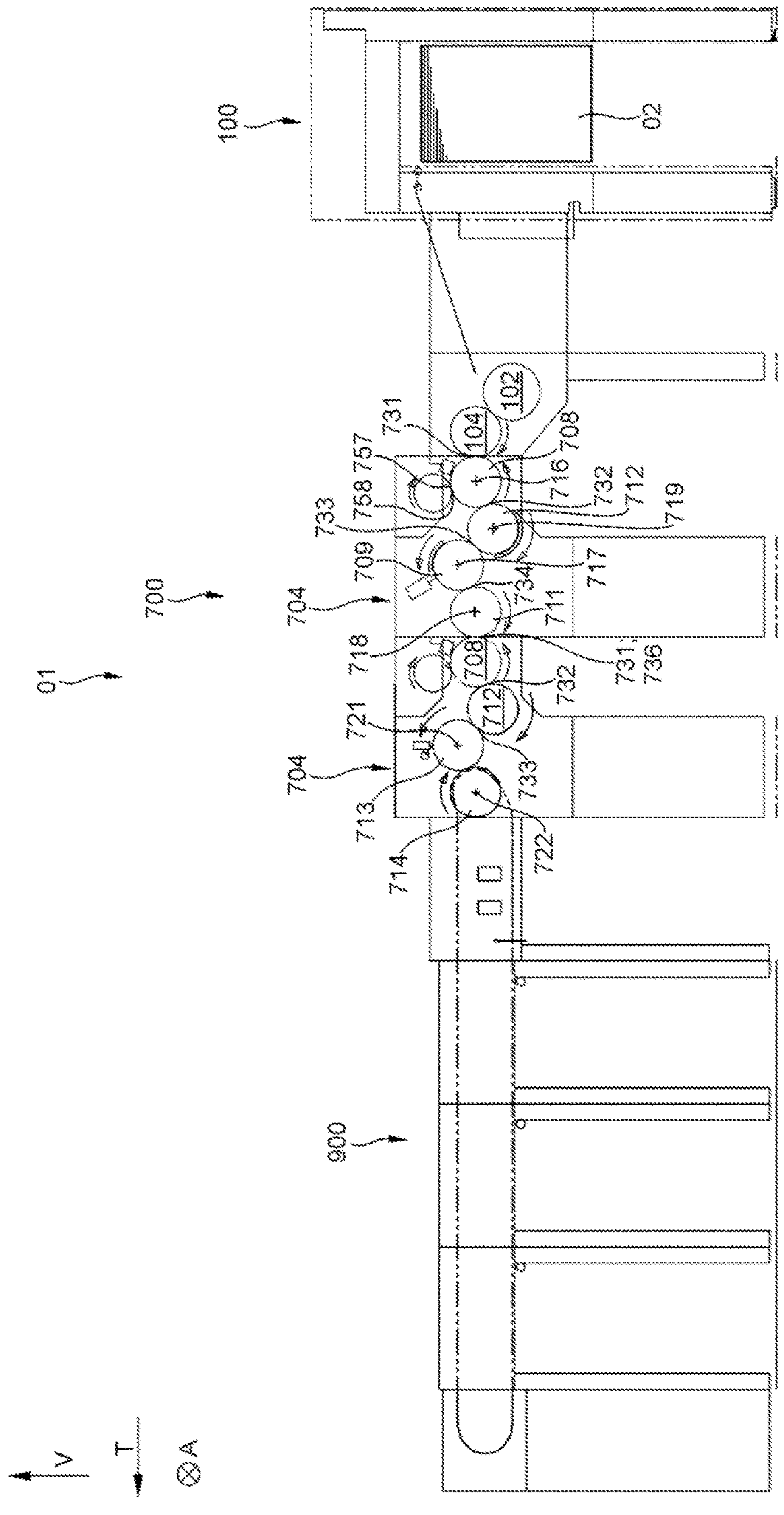
FIG. 1*c* a schematic illustration of a sheet-fed printing press comprising a screen printing unit and its transfer points.
Figure 1D:
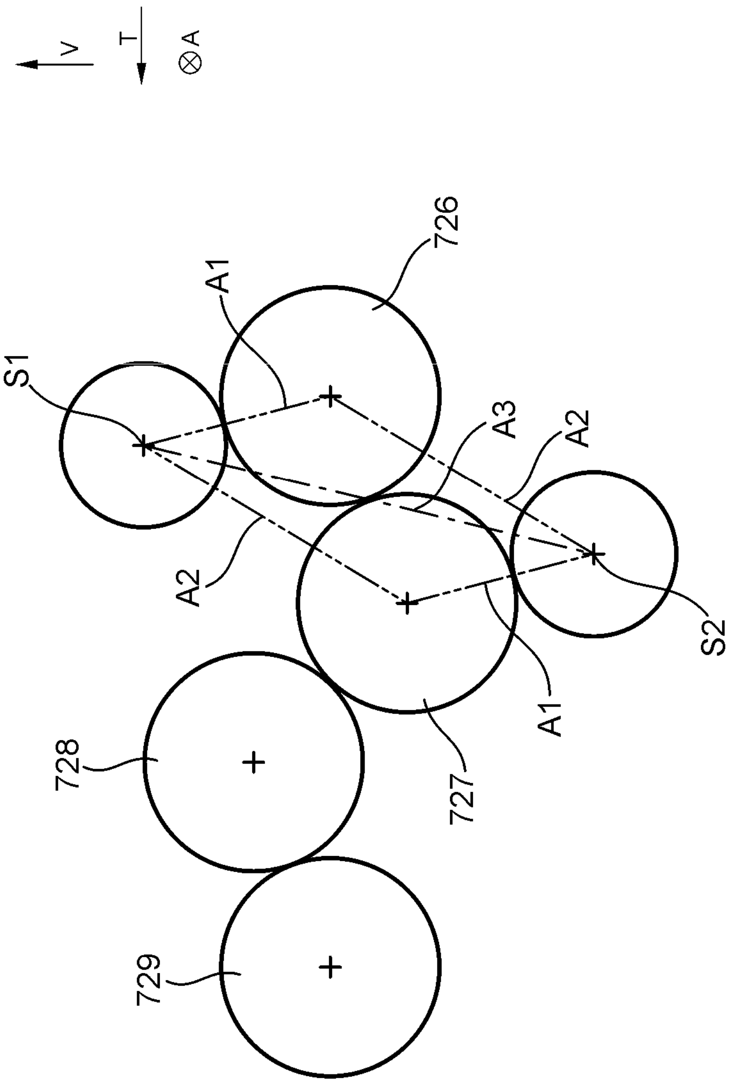
FIG. 1*d* a schematic illustration of axes of a base module according to FIG. 1*a;*
Figure 1E:
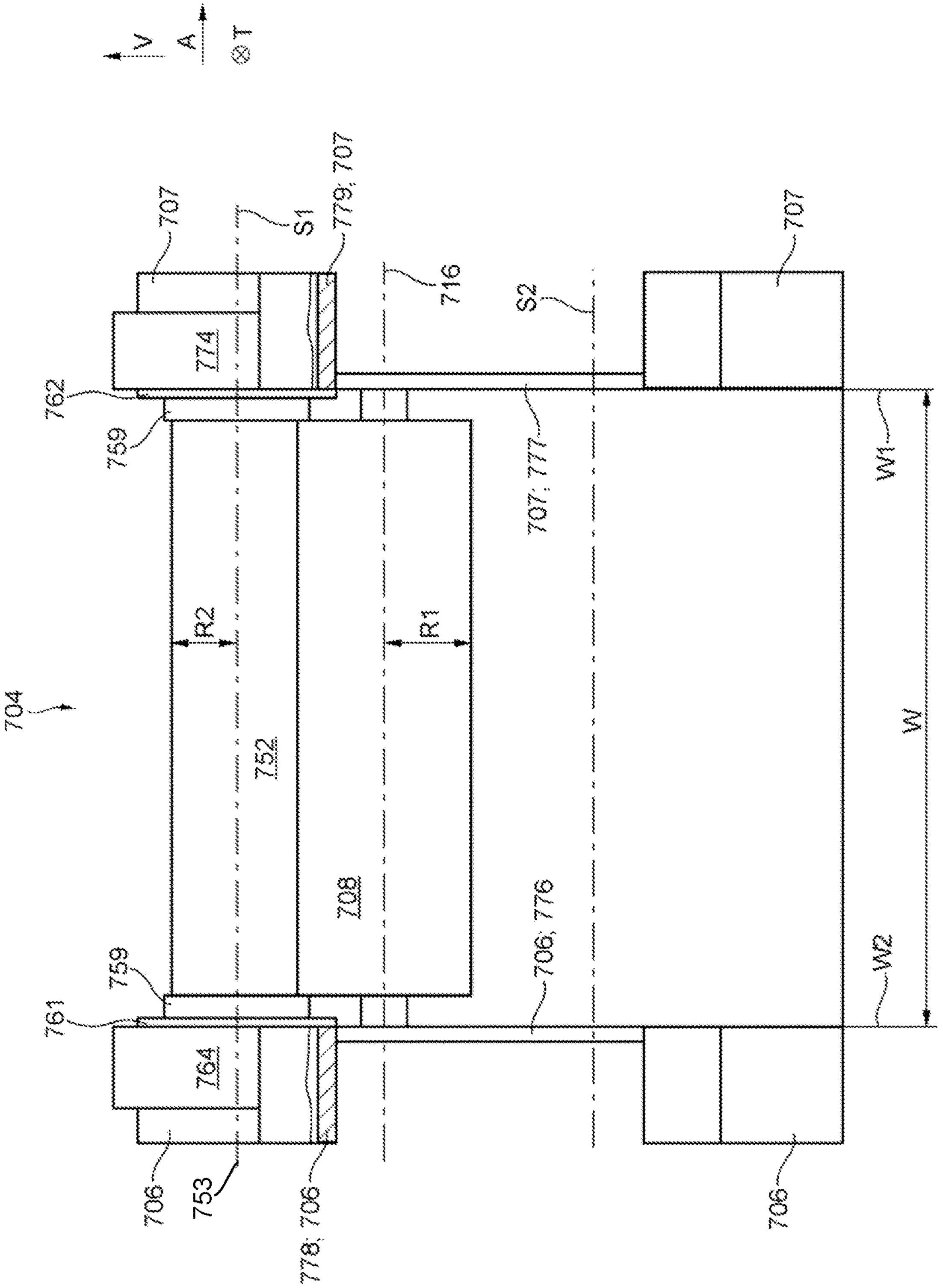
FIG. 1*e* a schematic illustration of a view of a base module seen in the transport direction, with base side walls being shown in a sectional view.
Figure 2:
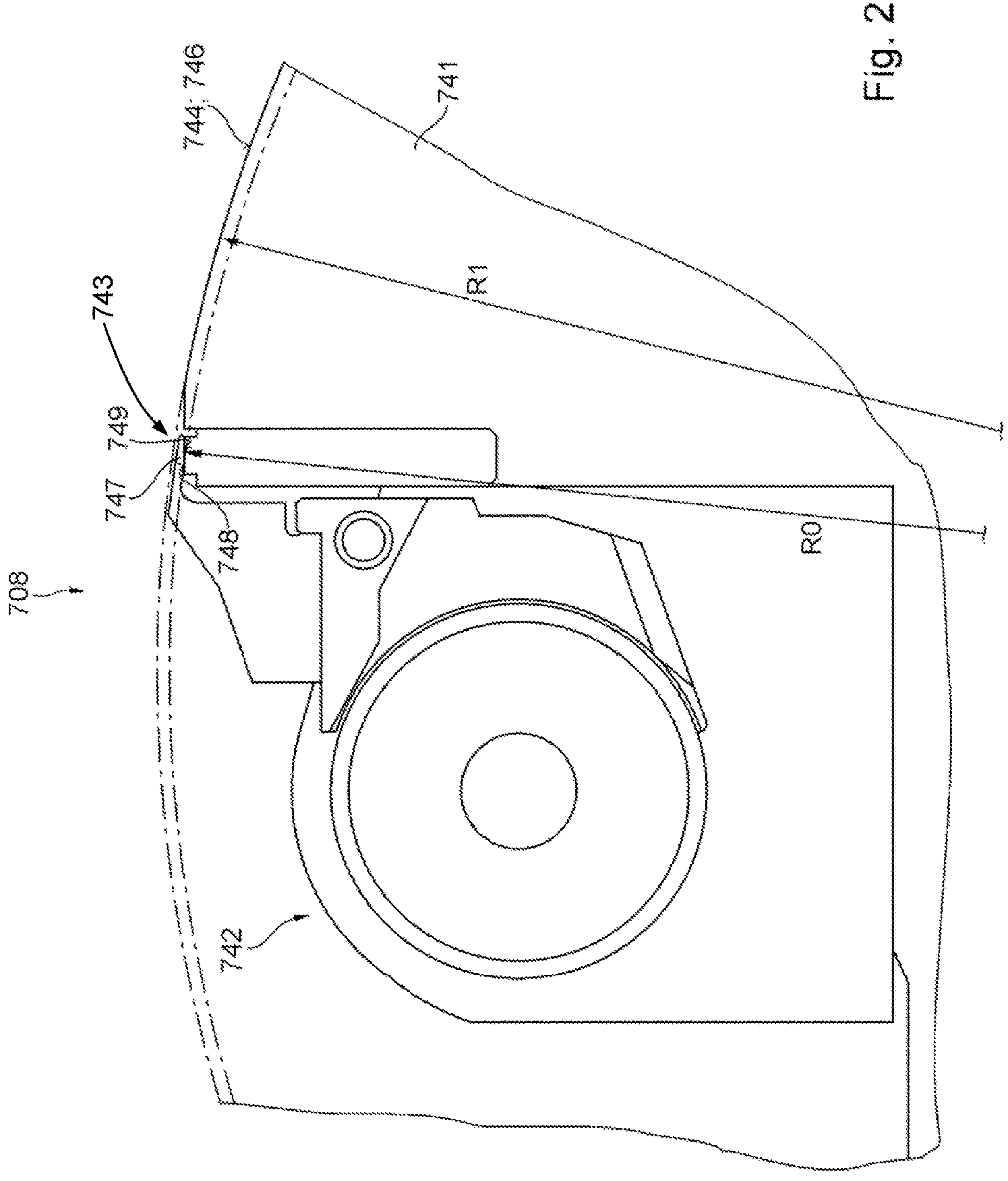
FIG. 2 a schematic illustration of a fixing element, configured as a gripper, of an impression cylinder of a screen printing unit.

A sheet-fed printing press 01 is preferably configured as a security printing press 01. The sheet-fed printing press 01 is preferably configured as a sheet-fed rotary printing press 01. The sheet-fed printing press 01 preferably comprises at least one sheet processing unit 200; 500; 600; 700. The at least one sheet processing unit 200; 500; 600; 700 is configured as a sheet-fed printing unit 200; 500; 600; 700, for example. Depending on the embodiment, different printing methods are possible. The sheet-fed printing press 01 is used to print substrate 02, in particular in the form of sheets 02. The sheets 02 are formed, for example, of cellulose-based or preferably cotton fiber-based, paper, of plastic polymer or a hybrid product thereof. Prior to being processed by the sheet-fed printing press 01, the sheets 02 may be uncoated or may already have been coated. The sheets 02 may be unprinted or already have been printed once or multiple times or have been mechanically processed in another manner. Preferably, several multiple-up copies, in particular print images of banknotes to be produced, are arranged in a row next to one another on a sheet 02, and several such rows of multiple-up copies or their print image are arranged one behind the other in the transport direction T or are accordingly arranged in the course of the processing operation of the particular sheet 02.

The sheet-fed printing press 01 preferably comprises at least one substrate feed device 100 or sheet feed device 100 configured as a sheet feeder 100, in particular in addition to the at least one sheet processing unit 200; 500; 600; 700 and/or along a transport path provided for a transport of sheets 02 upstream from the at least one, and more preferably upstream from each, sheet processing unit 200; 500; 600; 700. The at least one substrate feed device 100 preferably includes a conveyor line 101 configured, for example, as a feed table 101. For example, at least one receiving unit configured as a pile board is provided. It is then possible for printing substrate bundles, configured as sheet piles, to be arranged thereon for separation. The receiving unit is preferably connected to at least one transport means, which ensures that the respective uppermost sheet 02 of the sheet pile is arranged in a defined position, including when the sheet pile is being processed. The substrate feed device 100 preferably comprises sheet separation elements and sheet transport elements. The sheet separation elements are configured as separating suckers, for example. The sheet transport elements are configured as transport suckers, for example. Preferably, at least one front stop is provided. For example, the substrate feed device 100 comprises at least one non-stop device for an uninterrupted supply of sheets 02, including when a succeeding pile is provided. The feed table arranged downstream from the sheet pile is configured as a suction feed table. For example, at least one infeed device referred to as a sheet infeed is provided, which preferably comprises a feed table and comprises at least one movable front stop. The sheet feeder 100 preferably comprises at least one rocking gripper or rocker. A receiving drum 104 is preferably arranged downstream from the rocking gripper along the transport path provided for the transport of sheets 02. Preferably, sheets 02 are transferred from the rocking gripper to the receiving drum 104. The receiving drum 104 is a rotational transport body 104.

The sheet-fed printing press 01 preferably comprises at least one unit 900 configured as a delivery device 900, in particular a sheet delivery 900, in particular in addition to the at least one sheet processing unit 200; 500; 600; 700 and/or along the transport path provided for the transport of sheets 02 downstream from the at least one sheet feeder 100, and more preferably downstream from each sheet processing unit 200; 500; 600; 700. The sheet delivery 900 preferably comprises at least one sheet conveyor system 904, which is in particular configured as a chain conveyor system 904 or chain gripper system 904. The sheet conveyor system 904 comprises, for example, traction means moved by way of driving and deflection means, which drive gripping devices for conveying the sheets. The gripping devices comprise fixing elements for receiving and fixing the sheets 02. Fixing elements that can be used include grippers, in particular clamping and/or suction grippers for gripping the sheet edges. By means of the sheet delivery 900, the sheets 02 are preferably deposited onto at least one, or more preferably one of multiple transport bases, which are, for example, configured as a pallet or in another manner, in the form of a respective delivery pile. For example, a sheet guide device and/or a drying and/or curing device 906 are arranged in the sheet delivery 900. The sheets 02, which are preferably decelerated by a braking system, bear against front stops and in this way are deposited in an aligned manner onto the particular delivery pile. For example, the sheet delivery 900 is equipped with a non-stop device for transporting delivery piles away without interruption.

Alternatively or additionally, the delivery device 900, along the transport path provided for the transport of the substrate 02 and/or the sheets 02, comprises at least two, more preferably at least three, delivery stations 901; 902; 903 that are arranged one behind the other along the transport path provided for the transport of substrate 02. The at least one delivery device 900 is thus preferably configured as a multiple pile delivery unit 900, in particular at least as a dual pile delivery unit 900 or at least as a triple pile delivery unit 900 or at least as a quadruple pile delivery unit 900. The delivery stations 901; 902; 903 are also referred to as pile deliveries 901; 902; 903. A respective delivery station 901; 902; 903 or pile delivery 901; 902; 903 shall in particular be understood to mean a device that is used for forming a respective pile.

The transport path provided for the transport of in particular at least partially separated sheets 02 preferably starts at the substrate feed device 100 and/or preferably ends at the sheet delivery 900. Piles comprising multiple sheets 02 are preferably fed to the substrate feed device 100 and/or removed from the sheet delivery 900. The transport path of these piles shall not be considered to be part of the transport path provided for the transport of sheets 02.

For example, at least one full sheet control device 773 is arranged along the transport path provided for the transport of sheets 02. This device is used in particular to detect an arrival at an expected time and/or an expected shape of side edges of the sheets 02. The full sheet control device 773 comprises, for example, at least one source for electromagnetic radiation, in particular visible light, and a sensor for electromagnetic radiation, in particular visible light.

In the case of a curved transport path, a transport direction T is preferably in each case the direction T that runs tangential to a segment and/or point of the provided transport path closest to a respective reference point and that is provided for the transport of the substrate 02 and/or sheet 02 at this segment and/or point. This respective reference point is preferably situated at the point and/or at the component that is being related to the transport direction T. The transport direction T thus preferably in each case extends along the transport path intended for substrate 02 and/or sheets 02. A transverse direction A is preferably a direction A that extends orthogonally to the transport direction T and horizontally.

The sheet-fed printing press 01 preferably comprises at least one sheet processing unit 200; 500; 600; 700. For example, the sheet-fed printing press 01 comprises at least two or even more sheet processing units 200; 500; 600; 700. The at least one sheet processing unit 200; 500; 600; 700 is preferably at least also configured as a sheet-fed printing unit 200; 500; 600; 700. A sheet-fed printing unit 200; 500; 600; 700 shall possibly also, generally speaking, be understood to mean a sheet coating unit 200; 500; 600; 700, i.e., in particular also a sheet varnishing unit 200; 500; 600; 700. The sheet-fed printing press 01 comprises, for example, multiple printing units 200; 500; 600; 700, which are assigned to different printing methods. The sheet-fed printing press 01 preferably comprises at least one sheet-fed printing unit 700 configured as a screen printing unit 700. As a result of the screen printing method, a particularly large film thickness can be applied.

The screen printing unit 700 is used in particular for generating optically variable image elements, in particular security elements, on the sheets 02. The screen printing unit 700 preferably comprises at least one impression cylinder 708 and a screen printing forme cylinder 752 cooperating therewith. Together, the two form a respective screen printing nip 758. In this way, coating medium, in particular printing ink, can be applied in the customary manner onto sheets 02. Preferably, at least one optically variable coating medium is employed, in particular at least one optically variable printing ink and/or at least one optically variable varnish. This optically variable coating medium is applied, for example, across the entire surface area or preferably in partial regions in the form of first print image elements. The screen printing unit 700 preferably comprises at least one alignment device 771 for aligning particles which are contained in the optically variable coating medium that is applied onto the particular sheet 02 and which are responsible for the optical variability. Particles responsible for the optical variability that are preferably contained in the particular coating medium, in particular in the printing ink or in the varnish, are magnetic or magnetizable, non-spherical particles, e.g., pigment particles, here also referred to as magnetic particles or flakes for short. The at least one alignment device 771 preferably comprises multiple components. The screen printing unit 700 preferably comprises at least one alignment cylinder 709. This at least one alignment cylinder 709 is preferably an integral part of a respective alignment device 771. The screen printing unit 700 preferably comprises at least one pre-alignment device 767. This at least one pre-alignment device 767 is preferably an integral part of a respective alignment device 771.

The screen printing unit 700 preferably comprises at least one drying device 772. The term 'drying device' 772 shall also be understood to mean a curing device 772. The at least one respective drying device 772 can be considered to be an integral part of a respective alignment device 771, in particular since it is used for fixing the alignment. The at least one drying device 772 is preferably arranged on the transport path provided for the transport of sheets 02 downstream from, or more preferably in the region of, the alignment cylinder 709. The at least one drying device 772 is preferably configured as an in particular narrow-band radiation dryer 772, for example as an UV dryer 772, in particular a LED dryer 772, and more preferably an UV LED dryer 772. The dryer is preferably arranged along the transport path provided for the transport of sheets 02 so as to be directed, in the direction of an outer cylindrical surface of the respective alignment cylinder 709, at the transport angle W728; W729 thereof, over which the sheets 02 are conveyed by means of the alignment cylinder 709. So as to avoid unnecessary heating, the drying device 772 preferably operates in a narrow-band wavelength range that favors curing, e.g., in a wavelength band having a spectral full width at half maximum, based on the radiant power, of no more than 50 nm, and preferably no more than 30 nm. The maximum radiation preferably has a wavelength of 385±25 nm, and in particular 385±15 nm.

In a likewise advantageous refinement of the printing press 01, a drying and/or curing device 906 that is effective throughout the entire substrate width, for example a radiation dryer 906, in particular an UV dryer 906, is provided downstream from a last alignment device 771 for thoroughly drying the coating medium applied onto the sheets 02.

The screen printing unit 700 preferably comprises an in particular stationary frame 701, which has at least two in particular stationary frame side walls 702; 703. The screen printing unit 700 can be configured in a variety of embodiments. These embodiments preferably have in common that the respective screen printing unit 700 in each case comprises at least one, in particular stationary, base module 704. The respective base module 704 has two, in particular stationary, base side walls 706; 707 which are located opposite one another, and in particular opposite in the transverse direction A. Preferably, each base side wall 706; 707 is embodied in one piece, for example cast. At the same time, these base side walls 706; 707 are part of the, in particular stationary, frame 701 of the screen printing unit 700. These base side walls 706; 707 are preferably each an integral part of a respective frame side wall 702; 703. The frame side walls 702; 703 of the screen printing unit 700 are arranged opposite one another, and in particular opposite in the transverse direction A. The frame side walls 702; 703 are preferably connected, in particular rigidly, to one another via at least one, in particular stationary, cross member 723. The base side walls 706; 707 are preferably connected, in particular rigidly, to one another via at least one, in particular stationary, cross member 723.

Four installation areas 726; 727; 728; 729 for rotational transport bodies 708; 709; 711; 712; 713; 714 are in each case defined by the respective base module 704. A rotational transport body 708; 709; 711; 712; 713; 714 shall be understood to mean an assembly 708; 709; 711; 712; 713; 714 that is arranged rotatably about a respective axis of rotation 716; 717; 718; 719; 721; 722 and is used to transport sheets 02. Examples of rotational transport bodies 708; 709; 711; 712; 713; 714 are impression cylinders 708, alignment cylinders 709, transfer drums 711, blower drums 712, suction drums 713 and sprocket wheel shafts 714. Another example of a rotational transport body 102 is a receiving drum 102. The receiving drum 102, however, is preferably an integral part of the sheet feed device 100.

Preferably all rotational transport bodies 708; 709; 711; 712; 713; 714 of the respective base module 704, and more preferably all rotational transport bodies 708; 709; 711; 712; 713; 714 of the screen printing unit 700, have a single circumference, i.e., are configured to receive one sheet 02 around the circumference.

The four installation areas 726; 727; 728; 729 are preferably arranged in such a way that these and/or the respective rotational bodies 708; 709; 711; 712; 713; 714 arranged therein together define a section, assigned to the respective base module 704, of the transport path provided for the transport of sheets 02. The first installation area 726, viewed along the transport path provided for the transport of sheets 02, is referred as the first installation area 726 of the respective base module 704. The rotational transport body 708; 709; 711; 712; 713; 714 that is arranged in the first installation area 726 is referred to as the first rotational transport body 708; 709; 711; 712; 713; 714 of the respective base module 704. The second installation area 727, viewed along the transport path provided for the transport of sheets 02, is referred as the second installation area 727 of the respective base module 704. The rotational transport body 708; 709; 711; 712; 713; 714 that is arranged in the second installation area 727 is referred to as the second rotational transport body 708; 709; 711; 712; 713; 714 of the respective base module 704. The third installation area 728, viewed along the transport path provided for the transport of sheets 02, is referred as the third installation area 728 of the respective base module 704. The rotational transport body 708; 709; 711; 712; 713; 714 that is arranged in the third installation area 728 is referred to as the third rotational transport body 708; 709; 711; 712; 713; 714 of the respective base module 704. The fourth installation area 729, viewed along the transport path provided for the transport of sheets 02, is referred as the fourth installation area 729 of the respective base module 704. The rotational transport body 708; 709; 711; 712; 713; 714 that is arranged in the fourth installation area 729 is referred to as the fourth rotational transport body 708; 709; 711; 712; 713; 714 of the respective base module 704.

A through-plane E of the respective base module 704 is defined as the plane E that completely includes both the axis of rotation 716; 717; 718; 719; 721; 722 of the first rotational transport body 708; 709; 711; 712; 713; 714 of this particular base module 704 and the axis of rotation 716; 717; 718; 719; 721; 722 of the fourth rotational transport body 708; 709; 711; 712; 713; 714 of this particular base module 704. This through-plane E divides the space into hemispheres. The axis of rotation 716; 717; 718; 719; 721; 722 of the second rotational transport body 708; 709; 711; 712; 713; 714 of this particular base module 704 is preferably completely situated in the one of these two hemispheres, and the axis of rotation 716; 717; 718; 719; 721; 722 of the third rotational transport body 708; 709; 711; 712; 713; 714 of this particular base module 704 is preferably completely situated in the other of these two hemispheres. The through-plane E preferably has a normal vector N which deviates from a vertical direction V by no more than 45°, more preferably by no more than 20°, and still more preferably by no more than 10°. Still more preferably, the normal vector N extends in the vertical direction V. The axis of rotation 716; 717; 718; 719; 721; 722 of the second rotational transport body 708; 709; 711; 712; 713; 714 is preferably arranged lower than the axis of rotation 716; 717; 718; 719; 721; 722 of the third rotational transport body 708; 709; 711; 712; 713; 714, and more preferably also lower than the axis of rotation 716; 717; 718; 719; 721; 722 of the first rotational transport body 708; 709;

711; 712; 713; 714 and the axis of rotation 716; 717; 718; 719; 721; 722 of the fourth rotational transport body 708; 709; 711; 712; 713; 714. The axis of rotation 716; 717; 718; 719; 721; 722 of the third rotational transport body 708; 709; 711; 712; 713; 714 is preferably arranged higher than the axis of rotation 716; 717; 718; 719; 721; 722 of the second rotational transport body 708; 709; 711; 712; 713; 714, and more preferably also higher than the axis of rotation 716; 717; 718; 719; 721; 722 of the first rotational transport body 708; 709; 711; 712; 713; 714 and the axis of rotation 716; 717; 718; 719; 721; 722 of the fourth rotational transport body 708; 709; 711; 712; 713; 714.

Preferably, a respective transport angle W726; W727; W728; W729 is assigned to each rotational transport body 708; 709; 711; 712; 713; 714 of the particular base module 704. Such a transport angle W726; W727; W728; W729 shall be understood to mean the angular range around the respective axis of rotation 716; 717; 718; 719; 721; 722 of the respective rotational transport body 708; 709; 711; 712; 713; 714 in which sheets 02 are transported by means of this rotational transport body 708; 709; 711; 712; 713; 714, and in particular are transported while being held by the same.

The transport path provided for the transport of sheets 02 has a curvature in those areas in which a transport by means of rotational transport bodies 708; 709; 711; 712; 713; 714 occurs. During a transfer of the sheet from one rotational transport body 708; 709; 711; 712; 713; 714 to the next rotational transport body 708; 709; 711; 712; 713; 714, usually a change in the direction of curvature occurs. The radius of curvature corresponds, for example, to the distance between the axis of rotation 716; 717; 718; 719; 721; 722 of the respective rotational transport body 708; 709; 711; 712; 713; 714 on the one hand, and an inner contact surface 748 of the respective fixing element 743 of the respective rotational transport body 708; 709; 711; 712; 713; 714 on the other hand. The fixing elements 743 are preferably configured as grippers, in particular for gripping the sheet leading edges. For example, the fixing elements 743 are configured as clamping grippers and/or as suction grippers. An inner contact surface 748 shall be understood to mean the contact surface 748 against which the sheet 02 rests and is held. If, as with a clamping gripper, there are at least two cooperating contact surfaces 748; 749, the inner contact surface 748 shall be understood to mean the contact surface 748 that is arranged closer to the axis of rotation 716 about which it rotates. Respective transfer points 731; 732; 733; 734; 736 are used to transfer sheets 02 from one rotational transport body 708; 709; 711; 712; 713; 714 to a subsequent rotational transport body 708; 709; 711; 712; 713; 714. The respective transfer point 731; 732; 733; 734; 736 is configured, for example, as a line extending in the transverse direction A. The transfer points 731; 732; 733; 734; 736 are those points at which the direction of curvature of the transport path provided for the transport of sheets 02 reverses.

The respective base module 704 preferably has an entrance transfer point 731. At the entrance transfer point 731, for example, sheets 02 coming from the outside are transferred to the first rotational transport body 708; 709; 711; 712; 713; 714 of the base module 704. The entrance transfer point 731 is an interface 731 to a section of the transport path provided for the transport of sheets 02 which precedes the respective base module 704. The base module 704 preferably has three internal transfer points 732; 733; 734. A first internal transfer point 732 is preferably the transfer point 732 that is jointly defined by the first rotational transport body 708; 709; 711; 712; 713; 714 and the second rotational transport body 708; 709; 711; 712; 713; 714. A second internal transfer point 733 is preferably the transfer point 733 that is jointly defined by the second rotational transport body 708; 709; 711; 712; 713; 714 and the third rotational transport body 708; 709; 711; 712; 713; 714. A third internal transfer point 734 is preferably the transfer point 734 that is jointly defined by the third rotational transport body 708; 709; 711; 712; 713; 714 and the fourth rotational transport body 708; 709; 711; 712; 713; 714. In some embodiments of the screen printing unit 700, for example, the respective base module 704 has at least one exit transfer point 736. At the exit transfer point 736, for example, sheets 02 coming from the fourth rotational transport body 708; 709; 711; 712; 713; 714 of the base module 704 are transferred to the outside. The exit transfer point 736 is an interface 736 to a section of the transport path provided for the transport of sheets 02 which follows the respective base module 704. In the case where the fourth rotational transport body 708; 709; 711; 712; 713; 714 of the base module 704 is configured as a sprocket wheel shaft 714, no such exit transfer point 736 is defined. The sheets 02 are then transported away by means of the corresponding chain conveyor system 904 or chain gripper system 904, which preferably transitions into the sheet delivery 900.

A transport angle W726 of the first rotational transport body 708; 709; 711; 712; 713; 714 or of the first installation area 726 of the respective base module 704 is preferably more than 180°. For example, the transport angle W726 of this first rotational transport body 708; 709; 711; 712; 713; 714 or of this first installation area 726 is at least 190°, still more preferably at least 195°. The transport angle W726 of this first rotational transport body 708; 709; 711; 712; 713; 714 is preferably no more than 240°, more preferably no more than 220°, still more preferably no more than 205°, and still more preferably no more than 201°.

A transport angle W727 of the second rotational transport body 708; 709; 711; 712; 713; 714 or of this second installation area 727 of the respective base module 704 is preferably more than 180°. For example, the transport angle W727 of this second rotational transport body 708; 709; 711; 712; 713; 714 or of this second installation area 727 is at least 200°, still more preferably at least 220°, and still more preferably at least 240°. The transport angle W727 of this second rotational transport body 708; 709; 711; 712; 713; 714 or of this second installation area 727 is preferably no more than 300°, more preferably no more than 270°, still more preferably no more than 250°, and still more preferably no more than 245°.

A transport angle W728 of the third rotational transport body 708; 709; 711; 712; 713; 714 or of the third installation area 728 of the respective base module 704 is preferably more than 180°. For example, the transport angle W728 of this third rotational transport body 708; 709; 711; 712; 713; 714 or of this third installation area 728 is at least 200°, still more preferably at least 220°, and still more preferably at least 240°. The transport angle W728 of this third rotational transport body 708; 709; 711; 712; 713; 714 or of this third installation area 728 is preferably no more than 300°, more preferably no more than 270°, still more preferably no more than 250°, and still more preferably no more than 245°. The transport angle W728 of this third rotational transport body 708; 709; 711; 712; 713; 714 or of this third installation area 728 is preferably as large as the transport angle W727 of the second rotational transport body 708; 709; 711; 712; 713; 714 or of the third installation area 727.

A transport angle W729 of the fourth rotational transport body 708; 709; 711; 712; 713; 714 or of the fourth installation area 729 of the respective base module 704 is preferably more than 180°. For example, the transport angle W729 of this fourth rotational transport body 708; 709; 711; 712; 713; 714 or of this fourth installation area 729 is at least 190°, still more preferably at least 195°. The transport angle W729 of this fourth rotational transport body 708; 709; 711; 712; 713; 714 or of this fourth installation area 729 is preferably no more than 240°, more preferably no more than 220°, still more preferably no more than 205°, and still more preferably no more than 201°. The transport angle W729 of this fourth rotational transport body 708; 709; 711; 712; 713; 714 or of this fourth installation area 729 is preferably as large as the transport angle W726 of the first rotational transport body 708; 709; 711; 712; 713; 714 or of the first installation area 726. In the case where the fourth rotational transport body 708; 709; 711; 712; 713; 714 of the base module 704 is configured as a sprocket wheel shaft 714, in contrast, the transport angle W729 thereof is preferably more than 90°, more preferably more than 100°, and still more preferably more than 110° and/or preferably less than 180°, more preferably less than 150°, still more preferably less than 120°, and still more preferably less than 115°.

A base diameter is preferably assigned to the screen printing unit 700, and more preferably to the entire printing press 01. This base diameter, which corresponds to twice a base radius R0, is, for example, at least 250 mm, more preferably at least 350 mm, still more preferably at least 370 mm, and still more preferably at least 373 mm. This base diameter is preferably no more than 450 mm, more preferably no more than 400 mm, still more preferably no more than 380 mm, and still more preferably no more than 375 mm. The base radius R0 is exactly half the base diameter.

The screen printing unit 700, and preferably each base module 704, comprises at least one respective impression cylinder 708. A respective impression cylinder 708 comprises a cylinder barrel 741 and a cylinder channel 742. At least one fixing element 743 of the impression cylinder 708 is arranged in the cylinder channel 742. This at least one fixing element 743 is preferably configured as a gripper, and in particular as a clamping gripper. The at least one fixing element 743 is used in particular for gripping the sheet leading edges. The cylinder barrel 741 has a supporting surface 744 for sheets 02. This supporting surface 744 preferably includes at least one, and more preferably exactly one, impression portion 746 having a constant barrel radius R1. The at least one impression portion 746 preferably extends over an angle of at least 170°, and more preferably at least 180°, about the axis of rotation 716 of the impression cylinder 708. The barrel radius R1 is preferably larger than the base radius R0, for example by at least 0.5 mm, preferably at least 1 mm, and more preferably at least 2 mm, as well as, independently thereof, for example by no more than 10 mm, preferably no more than 5 mm, and more preferably no more than 4 mm. The barrel radius R1 is preferably smaller than twice the base radius R0.

The at least fixing element 743 preferably comprises at least one movable gripper finger 747, which is arranged so as to be movable relative to the cylinder barrel 741 of the impression cylinder 708. The at least one fixing element 743 preferably has two cooperating contact surfaces 748; 749. The inner contact surface 748 and the outer contact surface 749 are used to clamp the sheet 02, and in particular its leading edge. The inner contact surface 748 is the contact surface 748 located radially further to the inside. The outer contact surface 749 is the contact surface 749 located radially further to the outside. In particular only those surfaces 748; 749 that are located opposite one another shall be considered to be contact surfaces 748; 749 of the fixing element 743. The inner contact surface 748 may transition into the supporting surface 744 or form a portion of the supporting surface 744. The outer contact surface 749 is preferably movably configured for opening and/or for closing the fixing element 743, while the inner contact surface 749 is arranged so as to be stationary relative to the cylinder barrel 742. Based on the axis of rotation 716 of the impression cylinder 708, the impression portion 746 of the supporting surface 744 of the impression cylinder 708 preferably has a larger radius R1, referred to as a barrel radius R1, than the inner contact surface 748 of the fixing element 743. The barrel radius R1 is preferably larger than the largest distance between any part of the fixing element 743 in the fixing and/or closed state of the fixing element 743 and the axis of rotation 716 of the impression cylinder 708. In this way, it is preferably ensured that the at least one fixing element 743 of the impression cylinder 708 does not cause any damage to a screen printing forme 751. The inner contact surface 748 is preferably at least partially located at a distance from the axis of rotation 716 of the impression cylinder 708 which corresponds to the base radius R0.

A respective sheet 02 that is transported by means of the impression cylinder 708 is attached with its leading edge in the fixing elements 743 and rests partially, in particular largely, on the supporting surface 744, and in particular its impression portion 746. Since the front part of the sheet 02 is consequently located at a smaller distance from the axis of rotation 716 of the impression cylinder 708 than the part of the sheet 02 to be printed, the part of the sheet 02 to be printed is transported at a higher circumferential speed than the front part of the sheet 02, and in particular its leading edge.

Each impression cylinder 708 of the screen printing unit 700 is involved in the formation of two transfer points 731; 732; 733. If the respective impression cylinder 708 is arranged in the first installation area 726, these are the entrance transfer point 731 and the first internal transfer point 732. If the respective impression cylinder 708 is arranged in the second installation area 727, these are the first internal transfer point 732 and the second internal transfer point 733. An arrangement of an impression cylinder 708 of the screen printing unit 700 in the third installation area 728 or in the fourth installation area 729 is not provided. The impression cylinder 708 preferably forms a respective transfer point 731; 732; 733 with a rotational transport body 701; 711; 712, which is either configured as a receiving drum 104 or is configured as a transfer drum 711 or is configured as a blower drum 712. These three types of rotational transport bodies 104; 711; 712 preferably have in common that these, outside of an operating area of their fixing elements, only have extensions that are smaller than the base radius R0. In this way, collisions with the cylinder barrel 741 of the impression cylinder 708 are avoided.

The screen printing unit 700 is configured for printing sheets 02 by means of at least one printing forme 751 that is preferably configured as a cylindrical screen 751, and in particular a screen printing forme 751. This printing forme 751 preferably comprises a multiplicity of, in particular like and/or identical, image-producing elements, e.g., print image motifs, or, in particular like and/or identical, groups of image-producing print motifs around the circumference which, on a circumferential length corresponding to the print image length, are arranged, e.g., in a matrix-like manner in multiple columns, which are equidistantly spaced apart from one another transversely to the transport direction T, and on a cylinder width corresponding to the print image width are arranged in multiple rows, which are equidistantly spaced apart from one another in the transport direction T. These elements or print motifs are preferably embodied in the manner of screen printing stencils. The screen printing unit 700 preferably comprises at least one screen printing forme cylinder 752. Preferably, a dedicated impression cylinder 708 is assigned to each screen printing cylinder 752. A respective screen printing forme cylinder 752 carries such a cylindrical screen 751 and/or comprises such a cylindrical screen 751.

The screen printing forme cylinder 752 is arranged rotatably about an axis of rotation 753. A screen printing device 754 comprises at least one frame section 756 and the screen printing forme cylinder 752. The frame section 756 comprises, for example, at least two side support devices 761; 762, which are preferably connected to one another via at least one frame section cross member 763. The screen printing device 754 preferably additionally comprises at least one squeegee device 757. The squeegee device 757 cooperates with the cylindrical screen 751 in the known manner for applying printing ink through openings in the cylindrical screen 751 onto a respective sheet 02, as this respective sheet 02 is being transported while held by the impression cylinder 708. The impression cylinder 708 and the screen printing forme cylinder 752 together form a screen printing nip 758. The frame section 756 carries the screen printing forme cylinder 752 directly, or preferably indirectly via at least one forme cylinder mount 759. The squeegee device 757 is likewise an integral part of the screen printing device 754. The squeegee device 757 comprises at least one squeegee, which in particular can be thrown on and/or is thrown on the screen printing forme 751 by means of a squeegee adjusting device 764. The squeegee adjusting device 764 preferably comprises at least one squeegee positioning drive 737, which is configured as a linear drive 737, for example, and in particular as an electric linear motor 737 and/or as a pneumatic cylinder 737 and/or as a hydraulic cylinder 737.

The screen printing device 754, and in particular its frame section 756, is preferably arranged so as to be movable, and in particular pivotable, for example about a pivot axis 724, relative to the frame 701 of the screen printing unit 700, and in particular relative to the base side walls 706; 707 of the base module 704. A positioning drive 769 is preferably provided, by means of which the position of the screen printing device 754 can be adjusted relative to the base side walls 706; 707. This positioning drive 769 is configured, for example, in particular as an electric linear motor 769 and/or as a pneumatic cylinder 769 and/or as a hydraulic cylinder 769. The screen printing device 754 preferably comprises at least one, and more preferably exactly one, forme cylinder drive 766 driving in particular the screen printing forme cylinder 752. The forme cylinder drive 766 is preferably configured as an in particular closed loop position-controlled electric motor 766. In particular, the screen printing unit 700 preferably comprises at least one forme cylinder drive 766 per screen printing forme cylinder 752. This respective forme cylinder drive 766 is preferably different from any drive by means of which the impression cylinder 708 cooperating with the respective screen printing forme cylinder 752 can be driven. The at least one impression cylinder 708 can preferably be driven by means of a main drive of the screen printing unit 700 and/or of the printing press 01, in particular via at least one gear train.

The screen printing forme cylinder 752 and/or the cylindrical screen 751 preferably have an effective screen radius R2. The effective screen radius R2 is the distance of the surface of the screen printing forme cylinder 752 or of the cylindrical screen 751 that comes in contact with the sheets 02 to be printed. The effective screen radius R2 is preferably smaller than the barrel radius R1. The effective screen radius R2 is preferably smaller than the base radius R0. The effective screen radius R2 is preferably larger than half the barrel radius R1. The effective screen radius R2 is preferably larger than half the base radius R0. A screen diameter corresponds to twice the effective screen radius R2. The screen diameter is, for example, at least 240 mm, preferably at least 270 mm, more preferably at least 275 mm, and still more preferably at least 279 mm. This screen diameter is preferably no more than 380 mm, more preferably no more than 290 mm, still more preferably no more than 285 mm, and still more preferably no more than 281 mm.

In an alternative or additional refinement, the screen printing unit 700 is preferably characterized by comprising at least one screen printing forme cylinder 752 and at least one impression cylinder 708 cooperating therewith, and that a cylinder barrel 741 of the impression cylinder 708 includes a supporting surface 744 for sheets 02, which comprises at least one impression portion 746 having a constant barrel radius R1 that extends over an angle of at least 170° about the axis of rotation 716 of the impression cylinder 708, and that the screen printing forme cylinder 752 has an effective screen radius R2 and that the effective screen radius R2 is smaller than the barrel radius R1, and that the effective screen radius R2 is larger than half the barrel radius R1. In an alternative or additional refinement, the screen printing unit 700 is preferably characterized in that the screen printing unit 700 comprises at least one further rotational transport body 709; 711; 712; 713 forming, together with the impression cylinder 708, a transfer point 731; 732; 733, in particular for sheets 02, and that a fixing element, which is in particular provided for holding sheets 02, of the at least one further rotational transport body 709; 711; 712; 713 has an inner contact surface and an outer contact surface, which are arranged so as to cooperate for clamping sheets 02, and that this inner contact surface is at least partially located at a distance from an axis of rotation 717; 718; 719; 721 of this further rotational transport body 709; 711; 712; 713 which corresponds to the base radius R0, and that the effective screen radius R2 is smaller than the base radius R0, and that the effective screen radius R2 is larger than half the base radius R0.

In an alternative or additional refinement, the screen printing unit 700 is preferably characterized in that a fixing element 743 of the impression cylinder 708, which is in particular provided for holding sheets 02, has an inner contact surface 748 and an outer contact surface 749, which are arranged so as to cooperate for clamping sheets 02, and that this inner contact surface 748 is at least partially located at a distance from an axis of rotation 716 of the impression cylinder 708 which corresponds to the base radius R0, and that the barrel radius R1 is larger than the base radius R0.

For error-free printing, the cylindrical screen 751 has to rotate at a first circumferential speed during a printing operation which coincides, to as great an extent as possible with a second circumferential speed at which the cylinder barrel 741 of the impression cylinder 708 or the sheet 02 rotates. The difference between the screen radius R2 and the barrel radius R1, however, results in differing angles by which in each case the cylindrical screen 751 rotates on the one hand, and the impression cylinder 708 rotates on the other hand, during printing. During every revolution of the impression cylinder 708, first the supporting surface 744 passes the screen printing nip 758, and then the cylinder channel 742 passes the screen printing nip 758. The rotational movement of the screen printing forme cylinder 752 is preferably controlled by open-loop and/or closed-loop control in such a way that an adjustment is created while the cylinder channel 742 passes the screen printing nip 758.

A full revolution of the impression cylinder 708 is referred to as a revolution or process cycle and corresponds to an angle of rotation of 360°. This revolution is divided into a contact phase and a free phase. The contact phase is preferably characterized in that contact exists between the supporting surface 744 and/or a sheet 02 on the one hand, and the cylindrical screen 751 and/or a screen printing forme cylinder 752 on the other hand, in particular a rolling contact. The free phase is preferably characterized in that the supporting surface 744 and/or sheet 02 on the one hand and the cylindrical screen 751 and/or screen printing forme cylinder 752 on the other hand are arranged so as to not be in contact. The circumferential speed of the supporting surface 744 and/or of the sheet 02 on the one hand and of the cylindrical screen 751 and/or of the screen printing forme cylinder 752 on the other hand are preferably identical, or at least substantially identical, during a respective preceding contact phase. After completion of the respective preceding contact phase and/or during a respective free phase, the screen printing forme cylinder 752 is preferably decelerated, based on its circumferential speed, relative to the impression cylinder 708, and thereafter is accelerated again. A phase having a constant angular velocity may be present between the deceleration and the acceleration. What is relevant is that the average circumferential speed of the screen printing forme cylinder 752 during the respective free phase is lower than the average circumferential speed of the impression cylinder 708 during this respective free phase. At the start of and during a respective subsequent contact phase, the circumferential speed of the supporting surface 744 and/or of the sheet 02 on the one hand and of the cylindrical screen 751 and/or of the screen printing forme cylinder 752 on the other hand are then identical again or at least substantially identical. In this way, the impression cylinder 708 can catch up with the screen printing forme cylinder 752 despite its smaller circumference.

A method for operating a sheet-fed printing unit 700 configured as a screen printing unit 700 is preferred, wherein, during a sequence of several consecutive printing processes and respective interposed adjustment processes, an impression portion 746 of a supporting surface 744 of a cylinder barrel 741 of an impression cylinder 708 continuously rotates at a constant circumferential speed about its axis of rotation 716, and wherein, during this sequence of processes, a screen printing forme cylinder 752 forming, together with the impression cylinder 708, a screen printing nip 758 is periodically decelerated and accelerated.

In an alternative or additional embodiment or refinement, the method is preferably characterized in that a screen printing forme cylinder 752 and an impression cylinder 708 cooperating therewith together form a screen printing nip 758, in which sheets 02 are successively printed. In an alternative or additional refinement, the method is preferably characterized in that a respective sheet 02 is printed during a respective printing process, while an impression portion 746 of a supporting surface 744 of a cylinder barrel 741 of the impression cylinder 708 passes the screen printing nip 758. The printing process is preferably carried out during the contact phase. In an alternative or additional refinement, the method is preferably characterized in that a respective sheet 02, at least during its printing process, is held by means of at least one fixing element 743 on the counterpressure surface 746 of the supporting surface 744 of the impression cylinder 708 and, in the process, passes the screen printing nip 758 at a first sheet speed, while the impression cylinder 708 rotates at a first angular velocity. In an alternative or additional refinement, the method is preferably characterized in that, during the respective printing process of the particular sheet 02, the screen printing forme cylinder 752 rotates at a second angular velocity, which differs from the first angular velocity, about its axis of rotation 753, and the portion of the screen printing forme cylinder 752 that is in contact with the particular sheet 02 rotates at a first circumferential speed about this axis of rotation 753 of the screen printing forme cylinder 752, which is identical to the first sheet speed. In an alternative or additional refinement, the method is preferably characterized in that a respective adjustment process takes place in each case between two consecutive printing processes, during which the screen printing forme cylinder 752 is not in contact with any sheet 02 and the impression cylinder 708. The adjustment process is preferably carried out during the free phase. In an alternative or additional refinement, the method is preferably characterized in that, during the respective adjustment process, the impression cylinder 708 rotates at the first angular velocity and the screen printing forme cylinder at least intermittently at a third angular velocity, which is lower than the second angular velocity.

In an alternative or additional refinement, the method is preferably characterized in that an average angular velocity of the screen printing forme cylinder 752 is identical to an average angular velocity of the impression cylinder 708 cooperating therewith over a respective full process cycle, which lasts from the start of a printing process to the start of the next printing process. In an alternative or additional refinement, the method is preferably characterized in that an average circumferential speed of the screen printing forme cylinder 752 is lower than an average circumferential speed of the impression cylinder 708 cooperating therewith over the same respective full process cycle.

In an alternative or additional refinement, the method is preferably characterized in that the sheets 02, after their respective printing process 02, are transferred in particular indirectly to a succeeding rotational transport body 709; 711; 712 of the sheet-fed printing unit 700, and thereafter are transported in a transport process at the first angular velocity about the axis of rotation 717; 718; 719 of this subsequent rotational transport body 709; 711; 712. In an alternative or additional refinement, the method is preferably characterized in that a circumferential speed at which the sheets 02 are transported about this axis of rotation 717; 718; 719 during the respective transport process is identical to a second sheet speed, which is lower than the first sheet speed. This preferably also applies to the respective alignment cylinder 709.

The screen printing unit 700 comprises at least one transfer drum 711, for example. A respective transfer drum 711 conventionally comprises at least one gripper device for conveying the sheets. The respective transfer drum 711 preferably comprises at least one main body. The at least one gripper device comprises fixing elements for receiving and fixing the sheets 02. The fixing elements are preferably movably arranged on the main body and/or movable jointly therewith. Preferably, grippers, in particular clamping and/or suction grippers for gripping the sheet edges are provided as fixing elements. The respective transfer drum 711, and in particular its main body and/or its at least one gripper device, are rotatably arranged about an axis of rotation 718.

The transfer drum 711, for example, but not necessarily, comprises a supporting surface for sheets 02. The at least one gripper preferably comprises at least one movable gripper finger, which is arranged so as to be movable relative to a main body of the transfer drum 711. The at least one fixing element preferably has two cooperating contact surfaces, in particular an inner contact surface and an outer contact surface. The inner contact surface and the outer contact surface are used to clamp the sheet 02, and in particular its leading edge. The inner contact surface is the contact surface located radially further to the inside. The outer contact surface is the contact surface located radially further to the outside. The outer contact surface, for opening and/or for closing the gripper, is preferably movably configured, while the inner contact surface is arranged so as to be stationary relative to the main body of the transfer drum 711. The inner contact surface is preferably at least partially located at a distance from the axis of rotation 718 of the transfer drum 711 which corresponds to the base radius R0. In the case where the transfer drum 711 comprises a supporting surface for sheets, this surface is preferably located at a distance from the axis of rotation 718 of the transfer drum 711 which is smaller than the base radius R0. In this way, the transfer drum 711 can form a transfer point 732; 733 with an impression cylinder 708, without colliding with its cylinder barrel 741.

The screen printing unit 700 comprises at least one blower drum 712, for example. A respective blower drum 712 conventionally comprises at least one gripper device for conveying the sheets. The respective blower drum 712 preferably comprises at least one main body. The at least one gripper device comprises fixing elements for receiving and fixing the sheets 02. The fixing elements are preferably movably arranged on the main body and/or movable jointly therewith. Preferably, grippers, in particular clamping and/or suction grippers for gripping the sheet edges are provided as fixing elements. The respective blower drum 712, and in particular its at least one gripper device and/or its main body, are rotatably arranged about an axis of rotation 719. The at least one gripper preferably comprises at least one movable gripper finger, which is arranged so as to be movable relative to a main body of the blower drum 712. The at least one fixing element preferably has two cooperating contact surfaces. The inner contact surface and the outer contact surface are used to clamp the sheet 02, and in particular its leading edge. The inner contact surface is the contact surface located radially further to the inside. The outer contact surface is the contact surface located radially further to the outside. The outer contact surface, for opening and/or for closing the gripper, is preferably movably configured, while the inner contact surface is arranged so as to be stationary relative to the main body of the blower drum 711. The inner contact surface is preferably at least partially located at a distance from the axis of rotation 719 of the blower drum 712 which corresponds to the base radius R0.

The respective blower drum 712 preferably does not include a rotatable supporting surface for sheets 02. Preferably, at least one sheet guide device and at least one sheet blower device are provided. The at least one sheet guide device preferably has at least one inner surface, whose shape corresponds to a section of a cylinder shell having an axis that is identical to the axis of rotation 719 of the blower drum 712. This inner surface is preferably located at a distance from the axis of rotation 719 of the blower drum 712 which is larger than the base radius R0. The at least one sheet blower device is used to generate a flow of gas that is directed from the inside against the inner surface of this sheet guide device. In this way, the corresponding sheet 02, while being held by the gripper device, can be transported onward about the axis of rotation 719, while its inwardly directed side, apart from the contact surfaces of the fixing elements, does not come in contact with parts of the screen printing unit 700.

The respective blower drum 712 is preferably arranged, along the transport path provided for the transport of sheets 02, directly downstream from a respective impression cylinder 708, and more preferably also directly upstream from a respective alignment cylinder 709. Sheets can thus be transported from the impression cylinder 708 to the alignment cylinder 709, without a freshly printed sheet surface coming in contact with an object and the applied print image possibly becoming damaged thereby.

Preferably, at least one pre-alignment device 767 is arranged in the region of the blower drum 712. This at least one pre-alignment device 767 is preferably an integral part of a respective alignment device 771. This at least one pre-alignment device 767 is preferably arranged so as to be stationary. This at least one pre-alignment device 767 is preferably assigned to a respective blower drum 712, which more preferably is assigned to a respective downstream alignment cylinder 709. The pre-alignment device 767 is preferably configured so as to extend over an exposure angle about the axis of rotation 719 of the blower drum 712. The pre-alignment device 767 preferably comprises at least one, and more preferably several solenoids and/or permanent magnets.

The screen printing unit 700 comprises at least one suction drum 713, for example. A respective suction drum 713 conventionally comprises at least one gripper device for conveying the sheets. The respective suction drum 713 preferably comprises at least one main body. The at least one gripper device comprises fixing elements for receiving and fixing the sheets 02. The fixing elements are preferably movably arranged on the main body and/or movable jointly therewith. Preferably, grippers, in particular clamping and/or suction grippers for gripping the sheet edges are provided as fixing elements. The respective suction drum 713, and in particular its main body and/or its at least one gripper device, are rotatably arranged about an axis of rotation 721.

The suction drum 713 preferably comprises a supporting surface for sheets 02. The at least one gripper preferably comprises at least one movable gripper finger, which is arranged so as to be movable relative to a main body of the suction drum 713 and/or the supporting surface of the suction drum 713. The at least one fixing element preferably comprises two cooperating contact surfaces, in particular an inner contact surface and an outer contact surface. The inner contact surface and the outer contact surface are used to clamp the sheet 02, and in particular its leading edge. The inner contact surface is the contact surface located radially further to the inside. The outer contact surface is the contact surface located radially further to the outside. The outer contact surface, for opening and/or for closing the gripper, is preferably movably configured, while the inner contact surface is arranged so as to be stationary relative to the main body of the suction drum 713. The inner contact surface is preferably at least partially located at a distance from the axis of rotation 721 of the suction drum 713 which corresponds to the base radius R0. The supporting surface of the suction drum 713 is preferably arranged at a distance from the axis of rotation 721 of the suction drum 713 which corresponds to the base radius R0.

The supporting surface of the suction drum 713 preferably has suction openings, in particular for taking in ambient air and/or applying suction to sheets 02. When a sheet 02 is arranged on the supporting surface of the suction drum 713, its leading edge is preferably held by grippers. As an alternative or in addition, the sheet 02 is only held by the suction openings on the supporting surface. Preferably, at least one inspection device 768 is provided, and more preferably it is directed at the supporting surface of the suction drum 713. As a result of suction being applied to the respective sheet 02, its position on the suction drum 713 is especially stable. This makes it possible to carry out an inspection with particularly high precision. In an advantageous refinement, especially in conjunction with a delivery device 900 comprising multiple pile spaces, the at least one inspection device 768 is arranged downstream from a last alignment device 771, along the transport path provided for the transport of sheets 02. This at least one inspection device 768 operates by way of an incident light method and, preferably in addition to a light source that is directed at the transport path provided for the transport of sheets 02, comprises a camera that is directed at the impingement point thereof for the transport path provided for the transport of sheets 02. Sheets 02 considered to be defective or having a faulty print image can then be collected on one of the piles, while so-called good sheets are deposited onto a different pile.

The screen printing unit 700 comprises a sprocket wheel shaft 714, for example. This is in particular relevant when the sheet delivery 900 follows directly downstream from the screen printing unit 700 along the transport path provided for the transport of sheets 02. The sprocket wheel shaft 714 is used in particular for diverting a traction means, configured in particular as a chain, of a chain conveyor system 904 or chain gripper system 904. Its diameter is preferably matched to the base radius R0. Fixing elements of the chain conveyor system 904 or chain gripper system 904 preferably comprise two cooperating contact surfaces, in particular an inner contact surface and an outer contact surface. The inner contact surface and the outer contact surface are used to clamp the sheet 02, and in particular its leading edge. The inner contact surface is the contact surface located radially further to the inside. The outer contact surface is the contact surface located radially further to the outside. At least in the region of the sprocket wheel shaft, the inner contact surface is preferably at least partially located at a distance from the axis of rotation 722 of the sprocket wheel shaft 714 which corresponds to the base radius R0. The sprocket wheel shaft 714 is preferably arranged in the fourth installation area 729 of a base module 704.

As described, the screen printing unit 700 preferably comprises at least one alignment cylinder 709, which is in particular configured as a rotational transport body 709. The respective alignment cylinder 709 is preferably configured as a magnetically active alignment cylinder 709. Preferably, sheets 02 are transported by means of the respective alignment cylinder 709, and in the process the magnetic particles of the coating medium, which was previously applied and has not yet dried, are oriented in keeping with a pattern of magnetic field lines proceeding from the respective alignment cylinder 709. In the region of its outer circumference, the respective alignment cylinder 709 preferably comprises a plurality of elements inducing a magnetic field, or magnetic elements for short, which are used to orient at least some of the magnetic or magnetizable particles of the coating medium that is applied onto the respective passing sheet 02. The magnetic elements can be formed by permanent magnets with or without engraving, by solenoids, or by combinations of one or more permanent magnets and/or one or more solenoids. These can be removable and/or rotatable about a radially extending axis and/or be arranged on the cylinder main body so as to be adjustable, individually or in groups, with respect to their axial and/or circumferential position, and together therewith can form the respective alignment cylinder 709. For the case of the aforementioned plurality of multiple-up copies per sheet 02, multiple, e.g., at least four, rows of in each case multiple, e.g., three to eight, in particular four to seven, magnetic elements that are spaced apart from one another transversely to the transport direction T, are provided or can be provided on the circumference, e.g., in a matrix-like manner. By conveying the sheets 02 over the respective alignment cylinders 709, the particles are aligned or oriented by means of the magnetic field lines caused by the magnetic elements, possibly also through the particular sheet 02.

The magnetic elements can be arranged or arrangeable in or at multiple, e.g., three to eight, in particular in four to seven, ring elements that can be axially spaced apart from one another and preferably be positioned in the axial direction A, wherein in or at these ring elements, in turn, in each case at least one, preferably multiple, e.g., between two and twelve, advantageously between five and ten, magnets are arranged or can be arranged one behind the other in the circumferential direction and preferably positionable in the circumferential direction. For example, the at least one alignment cylinder 709 comprises at least one suction device, by means of which a respective sheet 02 can be held on the alignment cylinder 709.

The respective alignment cylinder 709 is preferably mounted between frame side walls 702; 703 of the screen printing unit 700 so as to be removable, in particular without removing one of the frame side walls 702; 703, for a replacement or for carrying out makeready work. This, however, shall be understood to mean a "planned" or "routine" removal or reinsertion, different from a dismantling or disassembly of the relevant assembly. For this purpose, for example at least on the drive side, a rotationally fixed, detachable connection is provided between the alignment cylinder 709 or cylinder journal and a following drive shaft, the disconnection point of which is situated within the inside width between the frame side walls 702; 703.

Preferably, at least one outer magnetic device 774 is provided, which is in particular configured as a simultaneous magnetic device 774. This at least one outer magnetic device 774 is preferably arranged so as to be stationary at least during printing. This at least one outer magnetic device 774 is preferably assigned to a respective alignment cylinder 709. This at least one outer magnetic device 774 is preferably an integral part of an alignment device 771, and in particular the alignment device 771 of which the assigned alignment cylinder 709 is also part. The outer magnetic device 774 is preferably configured so as to extend over an exposure angle about the assigned alignment cylinder 709. The outer magnetic device 774 preferably comprises at least one, and more preferably multiple solenoids and/or permanent magnets, and preferably cooperates with the magnetic devices of the respective alignment cylinder 709.

In an alternative or additional refinement, the sheet-fed printing unit 700 is preferably characterized by comprising at least one screen printing forme cylinder 752 and at least one impression cylinder 708 cooperating therewith, and at least one further rotational transport body 709; 711; 712; 713, and that a fixing element 743, provided in particular for holding sheets 02, of the impression cylinder 708 has an inner contact surface 748 and an outer contact surface 749, which are arranged so as to cooperate for clamping sheets 02, and that this inner contact surface 748 is at least partially located at a distance from an axis of rotation 716 of the impression cylinder 708 which corresponds to a base radius R0, and that a cylinder barrel 741 of the impression cylinder 708 has a supporting surface 744 for sheets 02 that includes at least one impression portion 746 having a constant barrel radius R1, which extends over an angle of at least 170° about the axis of rotation 716 of the impression cylinder 708, and that the barrel radius R1 is larger than the base radius R0, and that a fixing element, which is in particular provided for holding sheets 02, of the at least one further rotational transport body 709; 711; 712; 713 has an inner contact surface and an outer contact surface, which are arranged so as to cooperate for clamping sheets 02, and that this inner contact surface is at least partially located at a distance from an axis of rotation 717; 718; 719; 721 of this further rotational transport body 709; 711; 712; 713 which corresponds to the base radius R0. In an alternative or additional refinement, the sheet-fed printing unit 700 is preferably characterized in that the further rotational transport body 709; 711; 712; 713 is configured as an alignment cylinder 709, which comprises a plurality of elements inducing a magnetic field in the area of its outer circumference.

In an alternative or additional refinement, the sheet-fed printing unit 700 is preferably characterized in that a blower drum 712 is arranged so as to form a transfer point 732; 733 with the impression cylinder 708 and so as to form another transfer point 733; 734 with the alignment cylinder 709. In an alternative or additional refinement, the sheet-fed printing unit 700 is preferably characterized in that a fixing element of the at least one blower drum 712, which is in particular provided for holding sheets 02, has an inner contact surface and an outer contact surface, which are arranged so as to cooperate for clamping sheets 02, and this inner contact surface is at least partially located at a distance from an axis of rotation 719 of this blower drum 712 which corresponds to the base radius R0. In an alternative or additional refinement, the sheet-fed printing unit 700 is preferably characterized in that at least one sheet guide device and at least one sheet blower device are assigned to the blower drum 712, and the at least one sheet guide device comprises at least one inner surface, whose shape corresponds to a section of a cylinder shell having an axis that is identical to the axis of rotation 719 of the blower drum 712, and this inner surface is located at a distance from the axis of rotation 719 of the blower drum 712 which is larger than the base radius R0. In an alternative or additional refinement, the sheet-fed printing unit 700 is preferably characterized in that the at least one sheet blower device is used to generate a flow of gas that is directed from the inside against the inner surface of this sheet guide device. In an alternative or additional refinement, the sheet-fed printing unit 700 is preferably characterized in that at least one pre-alignment device 767 is arranged, in particular in a stationary manner, in the region of the blower drum 712, which is an integral part of a respective alignment device 771 and comprises at least one solenoid and/or permanent magnet.

In an alternative or additional refinement, the sheet-fed printing unit 700 is preferably characterized in that a stationary frame 701 of the screen printing unit 700 has two frame side walls 702; 703, and that the screen printing unit 700 comprises at least one stationary base module 704, which has two base side walls 706; 707 located opposite one another, and that the base module 704 defines four installation areas 726; 727; 728; 729 for rotational transport bodies 708; 709; 711; 712; 713; 714, and that the impression cylinder 708 is arranged in one of these four installation areas 726; 727, and that the at least one further rotational transport body 709; 711; 712; 713 is arranged in one of these four installation areas 728; 729. In an alternative or additional refinement, the sheet-fed printing unit 700 is preferably characterized in that a through-plane E of the base module 704 is defined as the plane E that completely includes both an axis of rotation 716; 717; 718; 719; 721; 722 of the first rotational transport body 708; 709; 711; 712; 713; 714 of this base module 704 and an axis of rotation 716; 717; 718; 719; 721; 722 of a fourth rotational transport body 708; 709; 711; 712; 713; 714 of this particular base module 704, and that the through-plane E has a normal vector N, which extends in the vertical direction V.

In an alternative or additional refinement, the sheet-fed printing unit 700 configured as a screen printing unit 700 is preferably characterized by comprising at least one screen printing forme cylinder 752 forming, together with an impression cylinder 708, a screen printing nip 758, and that along a transport path provided for a transport of sheets, downstream from the impression cylinder 708, at least one alignment cylinder 709 is arranged, which in the region of its outer circumference comprises a plurality of elements that induce a magnetic field. In an alternative or additional refinement, the screen printing unit 700 is preferably characterized in that a transport angle W728; W729 of the alignment cylinder 709 is the angular range about the axis of rotation 717 of the alignment cylinder 709 in which sheets 02 are transported by means of the alignment cylinder 709, and that at least one drying device 772 is arranged so as to be directed at the transport angle W728; W729 of the alignment cylinder 709, and that, viewed in the direction of rotation, downstream from the at least one drying device 772, at least one inspection device 768 is arranged so as to be directed at the transport angle W728; W729 of the alignment cylinder 709. In an alternative or additional refinement, the screen printing unit 700 is preferably characterized in that the impression cylinder 708 forms a transfer point 732 with a rotational transport body 712, and that this rotational transport body 712 forms another transfer point 733 with the alignment cylinder 709. In an alternative or additional refinement, the screen printing unit 700 is preferably characterized in that this rotational transport body 712 is configured as a blower drum 712. Preferably, a transport angle W727; W728 of the blower drum 712 is the angular range about the axis of rotation 719 of the blower drum 712 in which sheets 02 are transported by means of the blower drum 712, and a pre-alignment device 767 is arranged in the region of the transport angle W727; W728 of the blower drum 712, which comprises at least one element that induces a magnetic field.

In an alternative or additional refinement, the screen printing unit 700 is preferably characterized in that a transport angle W728 of the alignment cylinder 709 is more than 180° and/or at least 200° and/or at least 220° and/or at least 240° and/or that the transport angle W728 of the alignment cylinder 709 is no more than 300° and/or no more than 270° and/or no more than 250° and/or no more than 245°. In an alternative or additional refinement, the screen printing unit 700 is preferably characterized in that at least one stationary outer magnetic device 774, which is assigned to the alignment cylinder 709, is provided, and that the outer magnetic device 774 extends over an exposure angle around the assigned alignment cylinder 709, and that the outer magnetic device 774, viewed in the direction of rotation, is arranged upstream from the at least one drying device 772 so as to be directed at the transport angle W728; W729 of the alignment cylinder 709.

In an alternative or additional refinement, the screen printing unit 700 is preferably characterized in that, viewed in the direction of rotation, a shading device is arranged between the at least one drying device 772 and the at least one inspection device 768. The at least one inspection device 768 is preferably configured as a reflective inspection device 768 and/or preferably comprises at least one radiation source, in particular light source.

The screen printing unit 700 preferably comprises at least one screen printing forme cylinder 752 and at least one impression cylinder 708 cooperating therewith, wherein more preferably an effective screen radius R2 is assigned to the screen printing forme cylinder 752, and a barrel radius R1 is assigned to the impression cylinder 708. The screen printing unit 700 preferably comprises at least one, in particular stationary, frame 701, which comprises at least two, in particular stationary, frame side walls 702; 703 located opposite one another in a transverse direction A.

In an alternative or additional refinement, the screen printing unit 700 preferably comprises at least one in particular first base module 704, which comprises two stationary base side walls 706; 707 that each have a one-piece design and are each an integral part of a respective frame side wall 702; 703. The base side walls 706; 707 preferably each include a supporting wall 776; 777, and more preferably at least one reinforcement 778; 779. These two supporting walls 776; 777 preferably each define one of two inner wall planes W1; W2, by which more preferably an inside width W of the respective base module 704 is defined. The respective base module 704 in each case preferably includes at least four, and more preferably exactly four, installation areas 726; 727; 728; 729 for rotational transport bodies 708; 709; 711; 712; 713; 714, to which respective recesses 781; 782; 783; 784 in the supporting walls 776; 777 of the base side walls 706; 707 are assigned. Preferably, a respective rotational transport body 708; 709; 711; 712; 713; 714 is arranged in each of the at least four installation areas 726; 727; 728; 729.

Preferably, the first installation area 726 along the transport path provided for the transport of sheets 02 and the second installation area 727 of the respective base module 704 along this transport path form a selection group. A first axis of rotation 716; 717; 718; 719; 721; 722 is assigned to the rotational transport body 708; 709; 711; 712; 713; 714 arranged in the first installation area 726. A second axis of rotation 716; 717; 718; 719; 721; 722 is assigned to the rotational transport body 708; 709; 711; 712; 713; 714 arranged in the second installation area 727. Preferably, in particular during printing operation or in a printing operation position, a rotational transport body 708 configured as an impression cylinder 708 is arranged in one of the two installation areas 726; 727 of the selection group, which, for example, is arranged so as to cooperate with in particular two other rotational transport bodies 709; 711; 712; 713; 714 and with a screen printing forme cylinder 752. Preferably, in particular during printing operation or in a printing operation position, a rotational transport body 709; 711; 712; 713; 714 is arranged in the other of the two installation areas 726; 727 of the selection group, which is not in contact with any screen printing forme cylinder 752.

A first screen axis S1 is a straight line, which is oriented parallel to the transverse direction A, and which is located at a first distance A1 from the first axis of rotation 716; 717; 718; 719; 721; 722 and which is located at a second distance A2 from the second axis of rotation 716; 717; 718; 719; 721; 722. The first distance A1 preferably corresponds to the sum of the effective screen radius R2 and the barrel radius R1. The second distance A2 is preferably larger than the sum of the effective screen radius R2 and the barrel radius R1. The second distance A2 is preferably larger than 2.5 times the barrel radius R1. The second distance A2 is preferably smaller than 3.5 times, and more preferably than 3 times, the barrel radius R1. The first screen axis S1 is a possible position of an axis of rotation 753 of a screen printing forme cylinder 752. A second screen axis S2 is a straight line, which is oriented parallel to the transverse direction A, and which is located at the second distance A2 from the first axis of rotation 716; 717; 718; 719; 721; 722 and which is located at the first distance A1 from the second axis of rotation 716; 717; 718; 719; 721; 722. The second screen axis S2 is an alternative possible position of an axis of rotation 753 of a screen printing forme cylinder 752. The first screen axis S1 and the second screen axis S2 are located at a third distance A3 from one another which is larger than 3 times, and preferably than 3.5 times, the barrel radius R1. A first screen axis area includes at least the first screen axis S1. The first screen axis area has either no intersecting point with a base side wall 706; 707, or has only intersecting points with one or both base side walls 706; 707 that are located at least 2 cm, more preferably at least 5 cm, still more preferably at least 10 cm, and still more preferably at least 20 cm outside the spatial area bounded by the two inner wall planes W1; W2. A second screen axis area includes at least the second screen axis S2. The second screen axis area has either no intersecting point with a base side wall 706; 707, or has only intersecting points with one or both base side walls 706; 707 that are located at least 2 cm, more preferably at least 5 cm, still more preferably at least 10 cm, and still more preferably at least 20 cm outside the spatial area bounded by the two inner wall planes W1; W2.

In an alternative or additional refinement, the screen printing unit 700 is preferably characterized in that the first screen axis area, proceeding from the first screen axis S1, extends in any direction that is orthogonal to the transverse direction A over at least 1 cm, more preferably at least 2 cm, still more preferably at least 5 cm, and still more preferably at least 10 cm, and/or that the second screen axis area, proceeding from the second screen axis S2, extends in any direction that is orthogonal to the transverse direction A over at least 1 cm, more preferably at least 2 cm, still more preferably at least 5 cm, and still more preferably at least 10 cm.

In an alternative or additional refinement, the screen printing unit 700 is preferably characterized in that a screen printing forme cylinder 752 is arranged in a screen axis area of this particular base module 704, and no screen printing forme cylinder is arranged in the other screen axis area of this particular base module 704.

In an alternative or additional refinement, the screen printing unit 700 is preferably characterized in that each screen axis area, with respect to a transport direction T that is orthogonal to the transverse direction A, is entirely arranged downstream from an entrance transfer point 731. In an alternative or additional refinement, the screen printing unit 700 is preferably characterized in that one of the screen axis areas of the particular base module 704 overlaps with at least one squeegee adjusting device 764, which is arranged outside the spatial area bounded by the two inner wall planes W1; W2. In an alternative or additional refinement, the screen printing unit 700 is preferably characterized in that the at least one squeegee adjusting device 764 is arranged on a frame section 756 that is pivotably arranged on the base side walls 706; 707 of this base module 704. The frame section 756 is preferably arranged within the spatial area bounded by the two inner wall planes W1; W2. The frame section 756 is preferably arranged so as to carry the screen printing forme cylinder 752 via a forme cylinder mount 759.

The screen printing unit 700 preferably comprises at least one screen printing forme cylinder 752 and at least one impression cylinder 708 cooperating therewith. The screen printing unit 700 preferably comprises at least one, in particular stationary, frame 701, which comprises at least two, in particular stationary, frame side walls 702; 703 located opposite one another in a transverse direction A. The screen printing unit 700 preferably comprises at least one in particular first base module 704, which comprises two stationary base side walls 706; 707 that each have a one-piece design and are each an integral part of a respective frame side wall 702; 703. The base side walls 706; 707 preferably each include a supporting wall 776; 777, and more preferably at least one reinforcement 778; 779.

In an alternative or additional refinement, the screen printing unit 700 is preferably characterized by comprising at least one first base module 704 and at least one second base module 704, each base module 704 in each case comprising two stationary base side walls 706; 707, which each have a one-piece design and are each an integral part of a respective frame side wall 702; 703. The respective base module 704 in each case preferably includes four installation areas 726; 727; 728; 729 for rotational transport bodies 708; 709; 711; 712; 713; 714, to which, more preferably, respective recesses 781; 782; 783; 784 in the supporting walls W1; W2 of the base side walls 706; 707 are assigned. The relative position of the four installation areas 726; 727; 728; 729 of the first base module 704 with respect to one another preferably coincides with the relative position of the four installation areas 726; 727; 728; 729 of the second base module 704. Preferably, the respective first installation area 726 along the transport path provided for the transport of sheets 02 and the respective second installation area 727 of the respective base module 704 along this transport path form a respective selection group of the respective base module 704.

Preferably, an impression cylinder 708 cooperating with a screen printing forme cylinder 752 is arranged in exactly one of the installation areas 726; 727 of the selection group of the first base module 704. Preferably, a respective rotational transport body 708; 709; 711; 712; 713; 714 is arranged in each of the at least four installation areas 726; 727; 728; 729 of the two base modules 704.

In an alternative or additional refinement, the screen printing unit 700 is preferably characterized in that a functionally different rotational transport body 708; 709; 711; 712; 713; 714 is arranged in at least one installation area 726; 727; 728; 729 of the first base module 704 than in a corresponding installation area 726; 727; 728; 729, in terms of its installation position, of the second base module 704. For example, the sheet-fed printing unit 700 is then characterized in that a functionally different rotational transport body 708; 709; 711; 712; 713; 714 is arranged in a first installation area 726, along this transport path, of the first base module 704 than in a first installation area 726, along this transport path, of the second base module 704, and/or that a functionally different rotational transport body 708; 709; 711; 712; 713; 714 is arranged in a second installation area 727, along this transport path, of the first base module 704 than in a second installation area 727, along this transport path, of the second base module 704, and/or that a functionally different rotational transport body 708; 709; 711; 712; 713; 714 is arranged in a third installation area 728, along this transport path, of the first base module 704 than in a third installation area 728, along this transport path, of the second base module 704, and/or that a functionally different rotational transport body 708; 709; 711; 712; 713; 714 is arranged in a fourth installation area 729, along this transport path, of the first base module 704 than in a fourth installation area 729, along this transport path, of the second base module 704.

In an alternative or additional refinement, the screen printing unit 700 is preferably characterized in that an impression cylinder 708 cooperating with a screen printing forme cylinder 752 is arranged in exactly one of the installation areas 726; 727 of the selection group of the second base module 704. In an alternative or additional refinement, the screen printing unit 700 is preferably characterized in that the impression cylinder 708 arranged in the first base module 704 is arranged in a first installation area 726 of the first base module 704, and the impression cylinder 708 arranged in the second base module 704 is arranged in a first installation area 726 of the second base module 704. In an alternative or additional refinement, the screen printing unit 700 is preferably characterized in that the impression cylinder 708 arranged in the first base module 704 is arranged in a first installation area 726 of the first base module 704, and the impression cylinder 708 arranged in the second base module 704 is arranged in a second installation area 727 of the second base module 704.

In an alternative or additional refinement, the screen printing unit 700 is preferably characterized in that an alignment cylinder 709 is arranged in an installation area 726; 727; 728; 729 of the first base module 704, which in the region of its outer circumference comprises a plurality of elements that induce a magnetic field, and/or that an alignment cylinder 709 is arranged in an installation area 726; 727; 728; 729 of the second base module 704, which in the region of its outer circumference comprises a plurality of elements that induce a magnetic field. In an alternative or additional refinement, the screen printing unit 700 is preferably characterized in that a blower drum 712 is arranged in an installation area 726; 727; 728; 729 of the first base module 704 and/or that a blower drum 712 is arranged in an installation area 726; 727; 728; 729 of the second base module 704.

In addition to a described screen printing unit 700, a sheet-fed printing press 01, for example, comprises at least one further printing unit 200; 500; 600, which is configured as a sheet simultaneous printing unit 200 and/or which is configured as a sheet numbering printing unit 500 and/or which is configured as a flexographic printing unit 600. More preferably, a fixing element 743 of the respective impression cylinder 708, which is in particular provided for holding sheets 02, has an inner contact surface 748 and an outer contact surface 749, which are arranged so as to cooperate for clamping sheets 02, and this inner contact surface 748 is at least partially located at a distance from an axis of rotation 716 of the impression cylinder 708 which corresponds to a base radius R0, the barrel radius R1 being larger than the base radius R0. In an alternative or additional refinement, the printing press 01 is preferably characterized in that at least one fixing element, which is in particular provided for holding sheets 02, of at least one, and preferably each, sheet transport cylinder 201; 202; 501; 502; 601; 602 of this at least one further printing unit 200; 500; 600 has an inner contact surface and an outer contact surface, which are arranged so as to cooperate for clamping sheets 02, and that this inner contact surface is located at least partially at a distance from an axis of rotation 216; 217; 516; 517; 616; 617 of this sheet transport cylinder 201; 202; 501; 502; 601;

602 which corresponds to the base radius R0 or an integer multiple of the base radius R0, and in particular twice the base radius R0.

Hereafter, exemplary embodiments of printing presses 01 are described by way of example, which each comprise at least one screen printing unit 700. A substrate feed device 100 configured as a sheet feeder 100 is in each case arranged upstream from the respective screen printing unit 700, and a sheet delivery 900 configured as a multiple pile delivery unit 900 is arranged downstream therefrom. The respective printing presses 01 can be modified to the effect that these can additionally comprise further sheet processing units 200; 500; 600 between the sheet feeder 100 and the sheet delivery 900.

The sheet-fed printing press 01 preferably comprises a main drive, which drives a gear train. Preferably at least all rotational transport bodies 708; 709; 711; 712; 713; 714 of the screen printing unit 700 can be driven by way of this gear train, and more preferably also rotational transport bodies of potential other printing units 200; 500; 600 and/or of the sheet feeder 100 and/or the sheet delivery 900.

Figure 3A:
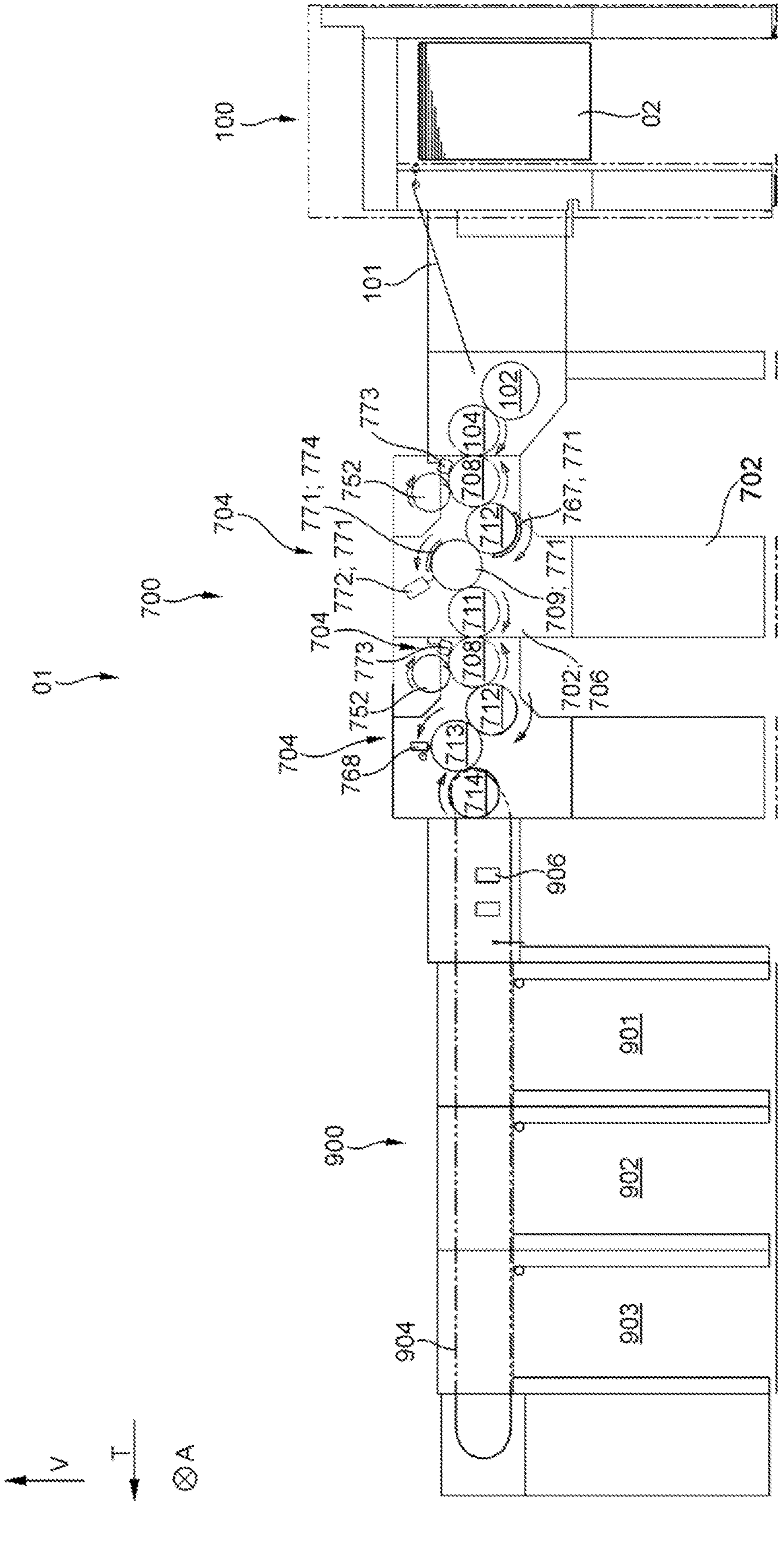
FIG. 3*a* a schematic illustration of a first embodiment of a sheet-fed printing press comprising a screen printing unit including two base modules.

A first exemplary embodiment of such a screen printing unit 700 comprises two base modules 704 abutting one another. The first base module 704 along the transport path provided for the transport of sheets 02 comprises an in particular first impression cylinder 708 in its first installation area 726, an in particular first blower drum 712 in its second installation area 727, an in particular first alignment cylinder 709 in its third installation area 728 and an in particular first transfer drum 711 in its fourth installation area 729. The second base module 704 along the transport path provided for the transport of sheets 02 comprises an in particular second impression cylinder 708 in its first installation area 726, an in particular second blower drum 712 in its second installation area 727, an in particular first suction drum 713 in its third installation area 728 and a sprocket wheel shaft 714 in its fourth installation area 729. Preferably, a respective screen printing forme cylinder 752 is arranged so as to cooperate with each impression cylinder 708. A pre-alignment device 767 is preferably arranged so as to cooperate with the first blower drum 712. A drying device 772 or curing device 772 and/or an outer magnetic device 774 are preferably arranged so as to cooperate with the alignment cylinder 709. Preferably, an inspection device 768 is arranged so as to cooperate with the suction drum 713. This first exemplary embodiment of a screen printing unit 700 allows a first printing of a front side of sheets 02, a subsequent alignment of particles applied in the process, a subsequent second printing of the front side of the sheets 02, and a subsequent inspection of the front side of the sheets 02. A sheet feeder 100 is arranged upstream from the screen printing unit 700, in particular in such a way that its receiving drum 104, together with the impression cylinder 708 of the first base module 704, forms its first transfer point 731. A sheet delivery 900 is arranged downstream from the screen printing unit 700, for example, in particular in such a way that the sprocket wheel shaft 714 is integrated into the sheet conveyor system 904 of the sheet delivery 900. (A sheet-fed printing press comprising such a screen printing unit 700 is shown schematically in FIG. 3*a* by way of example.)

A second exemplary embodiment of such a screen printing unit 700 comprises three base modules 704. The first base module 704 along the transport path provided for the transport of sheets 02 is connected to the second base module 704 by way of an intermediate module 738. The second base module 704 and the third base module 704 are arranged so as to abut one another. The first base module 704 along the transport path provided for the transport of sheets 02 comprises an in particular first impression cylinder 708 in its first installation area 726, an in particular first blower drum 712 in its second installation area 727, an in particular first alignment cylinder 709 in its third installation area 728 and an in particular first transfer drum 711 in its fourth installation area 729. Following these, the subsequent intermediate module 738 comprises a second alignment cylinder 709 and, downstream therefrom, an in particular second transfer drum 711. The second base module 704 along the transport path provided for the transport of sheets 02 comprises an in particular second impression cylinder 708 in its first installation area 726, an in particular second blower drum 712 in its second installation area 727, an in particular third alignment cylinder 709 in its third installation area 728 and an in particular third transfer drum 711 in its fourth installation area 729. The third base module 704 along the transport path provided for the transport of sheets 02 comprises an in particular fourth transfer drum 711 in its first installation area 726, an in particular third impression cylinder 708 in its second installation area 727, an in particular third blower drum 712 in its third installation area 728 and an in particular fourth alignment cylinder 709 in its fourth installation area 729. Subsequent thereto, an in particular first suction drum 713, an in particular second suction drum 713, an in particular fifth transfer drum 711 and a sprocket wheel shaft 714 are consecutively arranged in one or more intermediate frames 738.

Figure 3B:
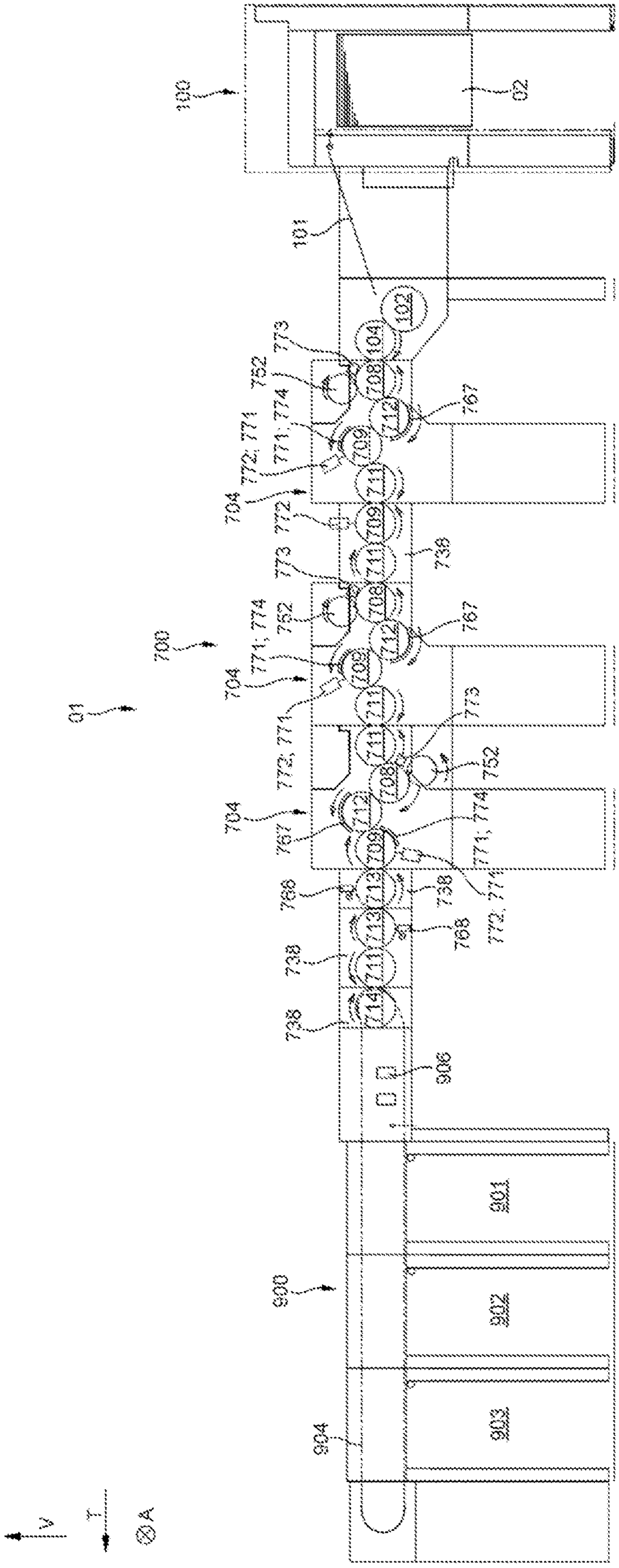
FIG. 3*b* a schematic illustration of a second embodiment of a sheet-fed printing press comprising a screen printing unit including three base modules.

Preferably, a respective screen printing forme cylinder 752 is arranged so as to cooperate with each impression cylinder 708. Preferably, a respective pre-alignment device 767 is arranged so as to cooperate with each blower drum 712. A respective drying device 772 or curing device 772 and/or an outer magnetic device 774 are preferably arranged so as to cooperate with each alignment cylinder 709. Preferably, a respective inspection device 768 is arranged so as to cooperate with each suction drum 713. This second exemplary embodiment of a screen printing unit 700 allows a first printing of a front side of sheets 02, a subsequent double alignment of particles applied in the process, a subsequent second printing of the front side of the sheets 02, a subsequent alignment of particles applied in the process, a first printing of a rear side of the sheets 02, a subsequent alignment of particles applied in the process and a subsequent inspection of the front side and the rear side of the sheets 02. A sheet feeder 100 is arranged upstream from the screen printing unit 700, in particular in such a way that its receiving drum 104, together with the impression cylinder 708 of the first base module 704, forms its first transfer point 731. A sheet delivery 900 is arranged downstream from the screen printing unit 700, for example, in particular in such a way that the sprocket wheel shaft 714 is integrated into the sheet conveyor system 904 of the sheet delivery 900. (A sheet-fed printing press comprising such a screen printing unit 700 is shown schematically in FIG. 3*b* by way of example.)

Figure 3C:
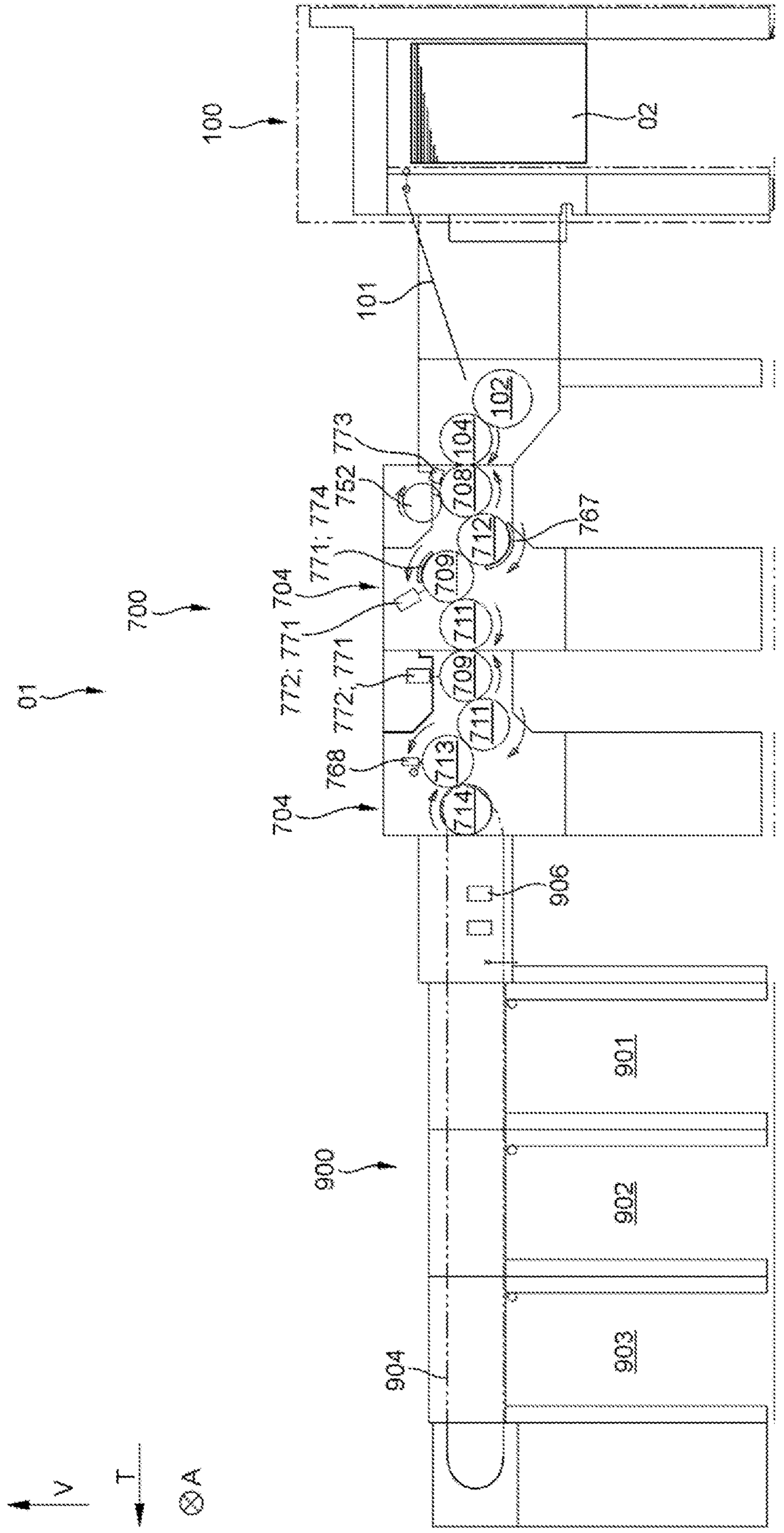
FIG. 3*c* a schematic illustration of a third embodiment of a sheet-fed printing press comprising a screen printing unit including two base modules.

A third exemplary embodiment of such a screen printing unit 700 comprises two base modules 704 that abut one another. The first base module 704 along the transport path provided for the transport of sheets 02 comprises an in particular first impression cylinder 708 in its first installation area 726, an in particular first blower drum 712 in its second installation area 727, an in particular first alignment cylinder 709 in its third installation area 728 and an in particular first transfer drum 711 in its fourth installation area 729. The second base module 704 along the transport path provided for the transport of sheets 02 comprises an in particular second alignment cylinder 709 in its first installation area 726, an in particular second transfer drum 711 in its second installation area 727, an in particular first suction drum 713 in its third installation area 728 and a sprocket wheel shaft 714 in its fourth installation area 729. Preferably, a respective screen printing forme cylinder 752 is arranged so as to cooperate with each impression cylinder 708. A pre-alignment device 767 is preferably arranged so as to cooperate with the first blower drum 712. A drying device 772 or curing device 772 and/or an outer magnetic device 774 are preferably arranged so as to cooperate with the alignment cylinder 709. Preferably, an inspection device 768 is arranged so as to cooperate with the suction drum 713. This third exemplary embodiment of a screen printing unit 700 allows a first printing of a front side of sheets 02, a subsequent first alignment of particles applied in the process, a subsequent second alignment of particles applied in the process, and a subsequent inspection of the front side of the sheets 02. A sheet feeder 100 is arranged upstream from the screen printing unit 700, in particular in such a way that its receiving drum 104, together with the impression cylinder 708 of the first base module 704, forms its first transfer point 731. A sheet delivery 900 is arranged downstream from the screen printing unit 700, for example, in particular in such a way that the sprocket wheel shaft 714 is integrated into the sheet conveyor system 904 of the sheet delivery 900. (A sheet-fed printing press comprising such a screen printing unit 700 is shown schematically in FIG. 3*c* by way of example.)

Figure 3D:
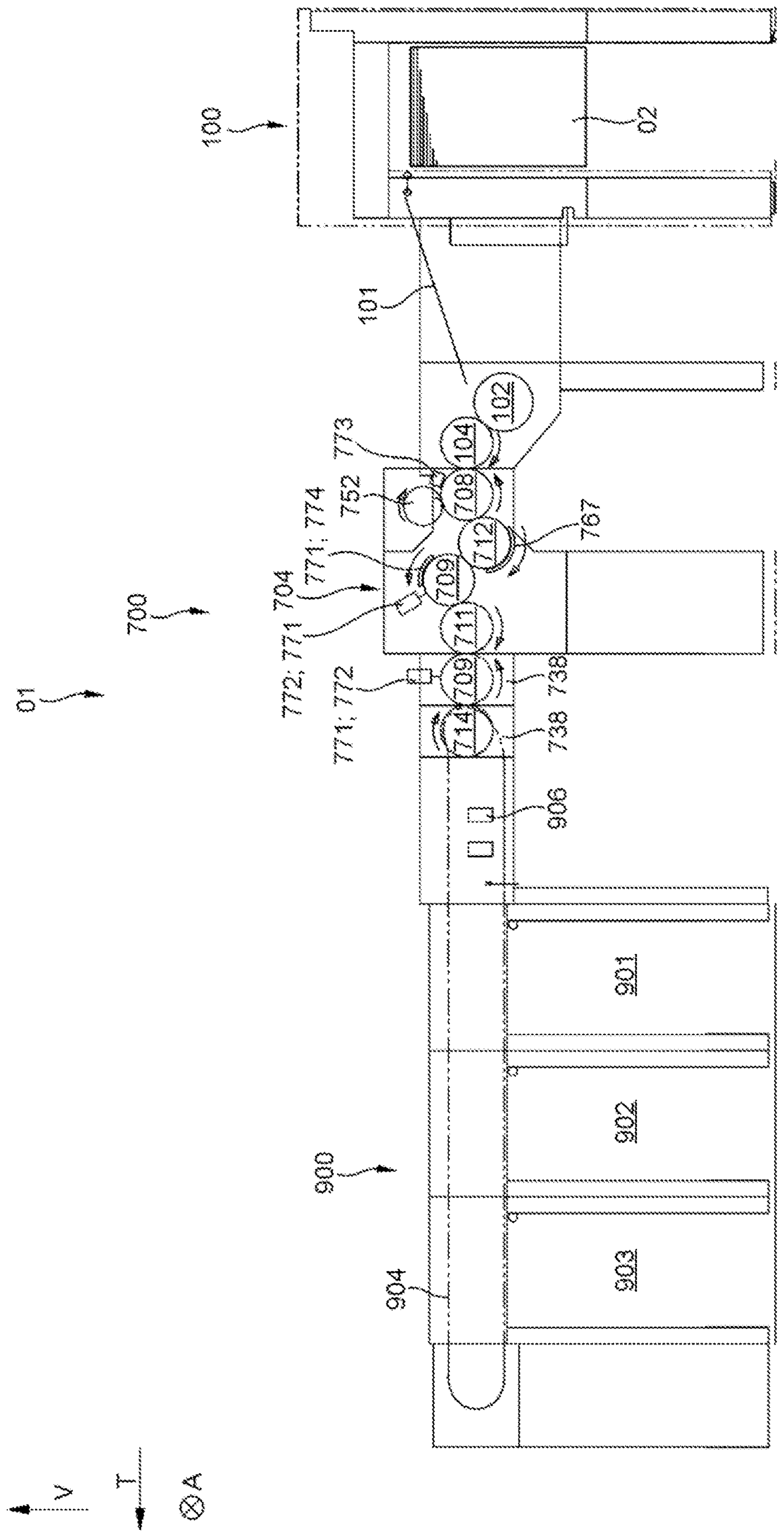
FIG. 3*d* a schematic illustration of a fourth embodiment of a sheet-fed printing press comprising a screen printing unit including one base module.

A fourth exemplary embodiment of such a screen printing unit 700 comprises one base module 704. The base module 704 comprises an impression cylinder 708 in its first installation area 726, a blower drum 712 in its second installation area 727, an in particular first alignment cylinder 709 in its third installation area 728 and a transfer drum 711 in its fourth installation area 729. Subsequent thereto, a second alignment cylinder 709 and a sprocket wheel shaft 714 are consecutively arranged in one or more intermediate frames 738. Preferably, a screen printing forme cylinder 752 is arranged so as to cooperate with the impression cylinder 708. A pre-alignment device 767 is preferably arranged so as to cooperate with the blower drum 712. A drying device 772 or curing device 772 and/or an outer magnetic device 774 are preferably arranged so as to cooperate with each alignment cylinder 709. This fourth exemplary embodiment of a screen printing unit 700 allows a printing of a front side of sheets 02, a subsequent alignment of particles applied in the process, and a subsequent second alignment of particles apple in the process. A sheet feeder 100 is arranged, for example, upstream from the screen printing unit 700, in particular in such a way that its receiving drum 104, together with the impression cylinder 708 of the first base module 704, forms its first transfer point 731. A sheet delivery 900 is arranged downstream from the screen printing unit 700, for example, in particular in such a way that the sprocket wheel shaft 714 is integrated into the sheet conveyor system 904 of the sheet delivery 900. (A sheet-fed printing press comprising such a screen printing unit 700 is shown schematically in FIG. 3*d* by way of example.)

A fifth exemplary embodiment of such a screen printing unit 700 comprises three base modules 704 that abut one another. The first base module 704 along the transport path provided for the transport of sheets 02 comprises an in particular first impression cylinder 708 in its first installation area 726, an in particular first blower drum 712 in its second installation area 727, an in particular first alignment cylinder 709 in its third installation area 728 and an in particular first transfer drum 711 in its fourth installation area 729. The second base module 704 along the transport path provided for the transport of sheets 02 comprises an in particular second impression cylinder 708 in its first installation area 726, an in particular second blower drum 712 in its second installation area 727, an in particular second alignment cylinder 709 in its third installation area 728 and an in particular second transfer drum 711 in its fourth installation area 729. The third base module 704 along the transport path provided for the transport of sheets 02 comprises an in particular third transfer drum 711 in its first installation area 726, an in particular third impression cylinder 708 in its second installation area 727, an in particular third blower drum 712 in its third installation area 728 and an in particular third alignment cylinder 709 in its fourth installation area 729. Subsequent thereto, an in particular first suction drum 713, an in particular second suction drum 713, an in particular fourth transfer drum 711 and a sprocket wheel shaft 714 are consecutively arranged in one or more intermediate frames 738.

Figure 3E:
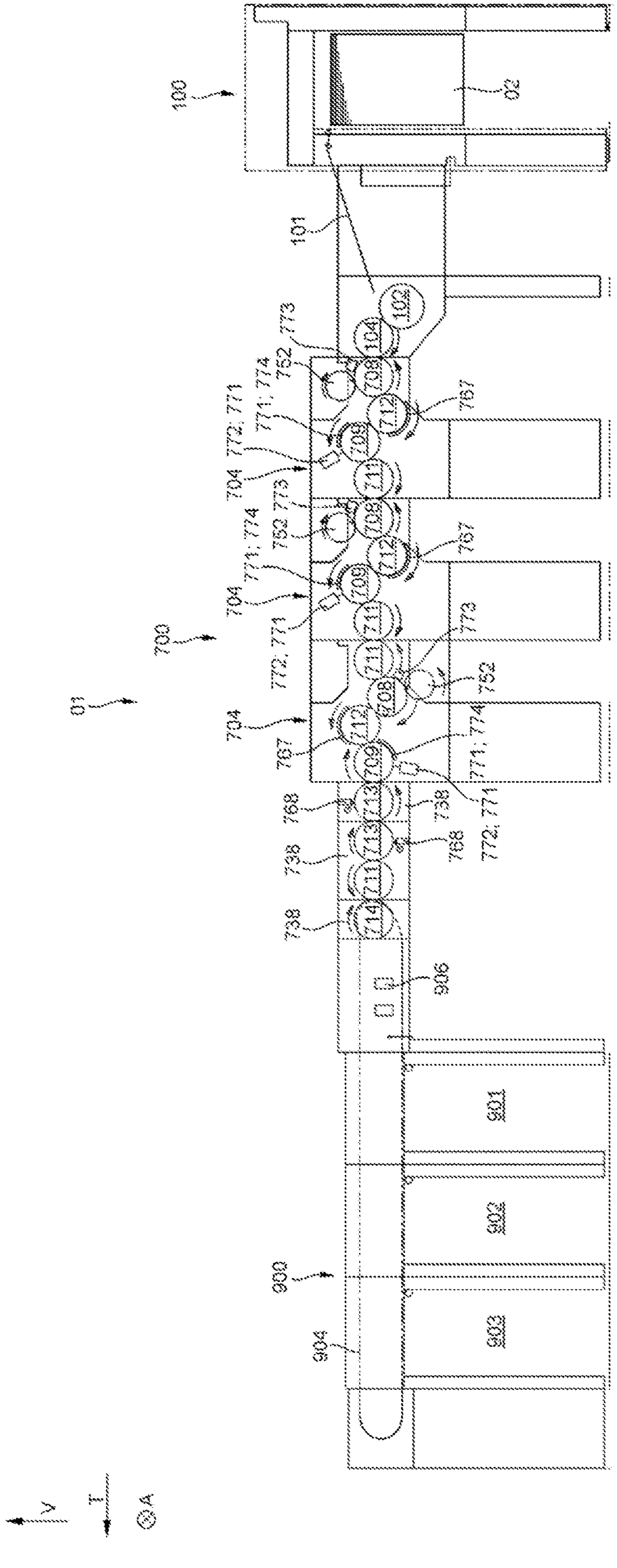
FIG. 3*e* a schematic illustration of a fifth embodiment of a sheet-fed printing press comprising a screen printing unit including three base modules.

Preferably, a respective screen printing forme cylinder 752 is arranged so as to cooperate with each impression cylinder 708. Preferably, a respective pre-alignment device 767 is arranged so as to cooperate with each blower drum 712. A respective drying device 772 or curing device 772 and/or an outer magnetic device 774 are preferably arranged so as to cooperate with each alignment cylinder 709. Preferably, a respective inspection device 768 is arranged so as to cooperate with each suction drum 713. This fifth exemplary embodiment of a screen printing unit 700 allows a first printing of a front side of sheets 02, a subsequent alignment of particles applied in the process, a subsequent second printing of the front side of the sheets 02, a subsequent alignment of particles applied in the process, a first printing of a rear side of the sheets 02, a subsequent alignment of particles applied in the process and a subsequent inspection of the front side and the rear side of the sheets 02. A sheet feeder 100 is arranged upstream from the screen printing unit 700, in particular in such a way that its receiving drum 104, together with the impression cylinder 708 of the first base module 704, forms its first transfer point 731. A sheet delivery 900 is arranged downstream from the screen printing unit 700, for example, in particular in such a way that the sprocket wheel shaft 714 is integrated into the sheet conveyor system 904 of the sheet delivery 900. (A sheet-fed printing press comprising such a screen printing unit 700 is shown schematically in FIG. 3*e* by way of example.)

A sixth exemplary embodiment of such a screen printing unit 700 comprises two base modules 704 that abut one another. The first base module 704 along the transport path provided for the transport of sheets 02 comprises an in particular first impression cylinder 708 in its first installation area 726, an in particular first blower drum 712 in its second installation area 727, an in particular first alignment cylinder 709 in its third installation area 728 and an in particular first transfer drum 711 in its fourth installation area 729. The second base module 704 along the transport path provided for the transport of sheets 02 comprises an in particular second transfer drum 711 in its first installation area 726, an in particular second impression cylinder 708 in its second installation area 727, an in particular second blower drum 712 in its third installation area 728 and an in particular second alignment cylinder 709 in its fourth installation area 729. Subsequent thereto, an in particular first suction drum 713, an in particular second suction drum 713, an in particular third transfer drum 711 and a sprocket wheel shaft 714 are consecutively arranged in one or more intermediate frames 738.

Figure 3F:
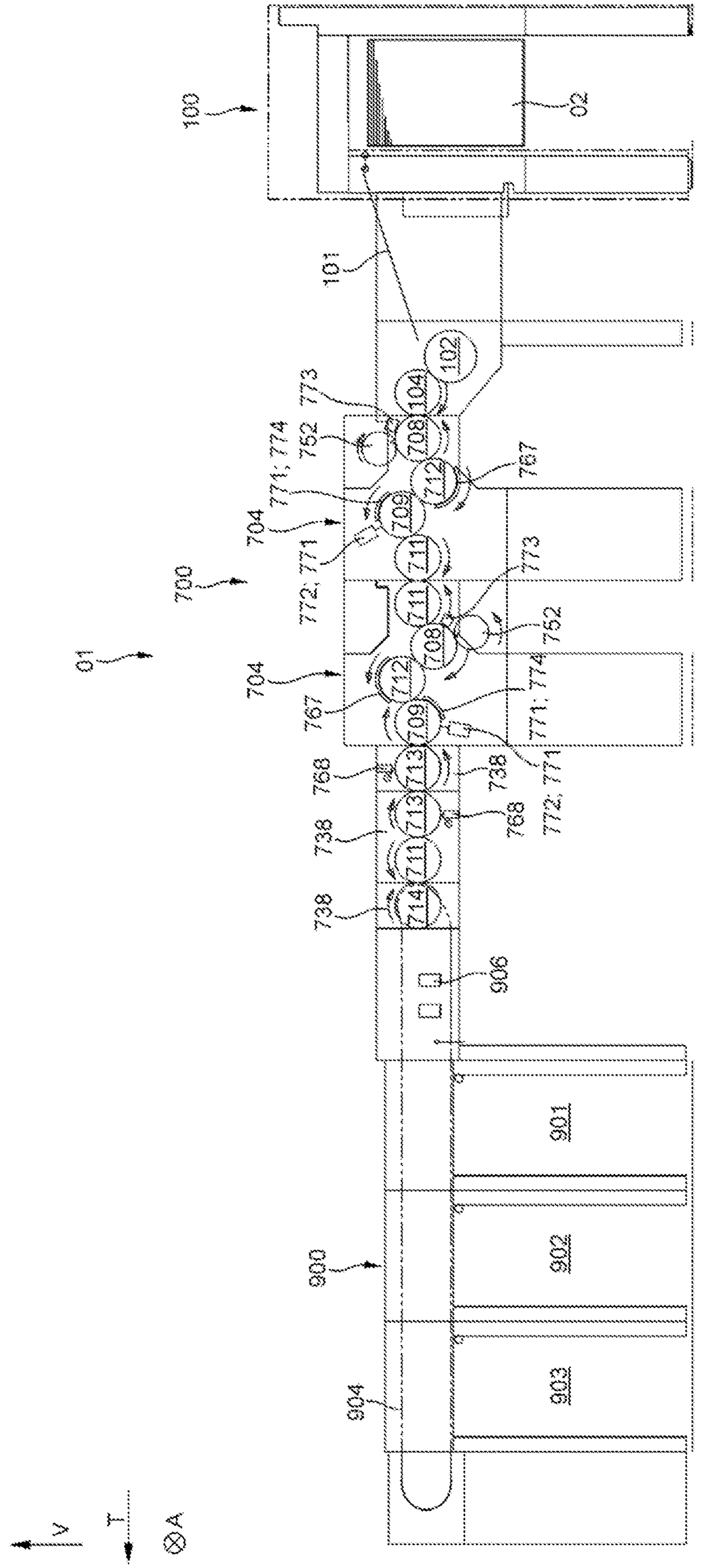
FIG. 3*f* a schematic illustration of a sixth embodiment of a sheet-fed printing press comprising a screen printing unit including two base modules.

Preferably, a respective screen printing forme cylinder 752 is arranged so as to cooperate with each impression cylinder 708. Preferably, a respective pre-alignment device 767 is arranged so as to cooperate with each blower drum 712. A respective drying device 772 or curing device 772 and/or an outer magnetic device 774 are preferably arranged so as to cooperate with each alignment cylinder 709. Preferably, a respective inspection device 768 is arranged so as to cooperate with each suction drum 713. This sixth exemplary embodiment of a screen printing unit 700 allows a printing of a front side of sheets 02, a subsequent alignment of particles applied in the process, a printing of a rear side of the sheets 02, a subsequent alignment of particles applied in the process, and a subsequent inspection of the front side and the rear side of the sheets 02. A sheet feeder 100 is arranged upstream from the screen printing unit 700, in particular in such a way that its receiving drum 104, together with the impression cylinder 708 of the first base module 704, forms its first transfer point 731. A sheet delivery 900 is arranged downstream from the screen printing unit 700, for example, in particular in such a way that the sprocket wheel shaft 714 is integrated into the sheet conveyor system 904 of the sheet delivery 900. (A sheet-fed printing press comprising such a screen printing unit 700 is shown schematically in FIG. 3*f* by way of example.)

A seventh exemplary embodiment of such a screen printing unit 700 comprises two base modules 704 that abut one another. The first base module 704 along the transport path provided for the transport of sheets 02 comprises an in particular first impression cylinder 708 in its first installation area 726, an in particular first blower drum 712 in its second installation area 727, an in particular first alignment cylinder 709 in its third installation area 728 and an in particular first transfer drum 711 in its fourth installation area 729. The second base module 704 along the transport path provided for the transport of sheets 02 comprises an in particular second impression cylinder 708 in its first installation area 726, an in particular second blower drum 712 in its second installation area 727, an in particular second alignment cylinder 709 in its third installation area 728 and an in particular second transfer drum 711 in its fourth installation area 729. Subsequent thereto, a suction drum 713 and a sprocket wheel shaft 714 are consecutively arranged in one or more intermediate frames 738.

Figure 3G:
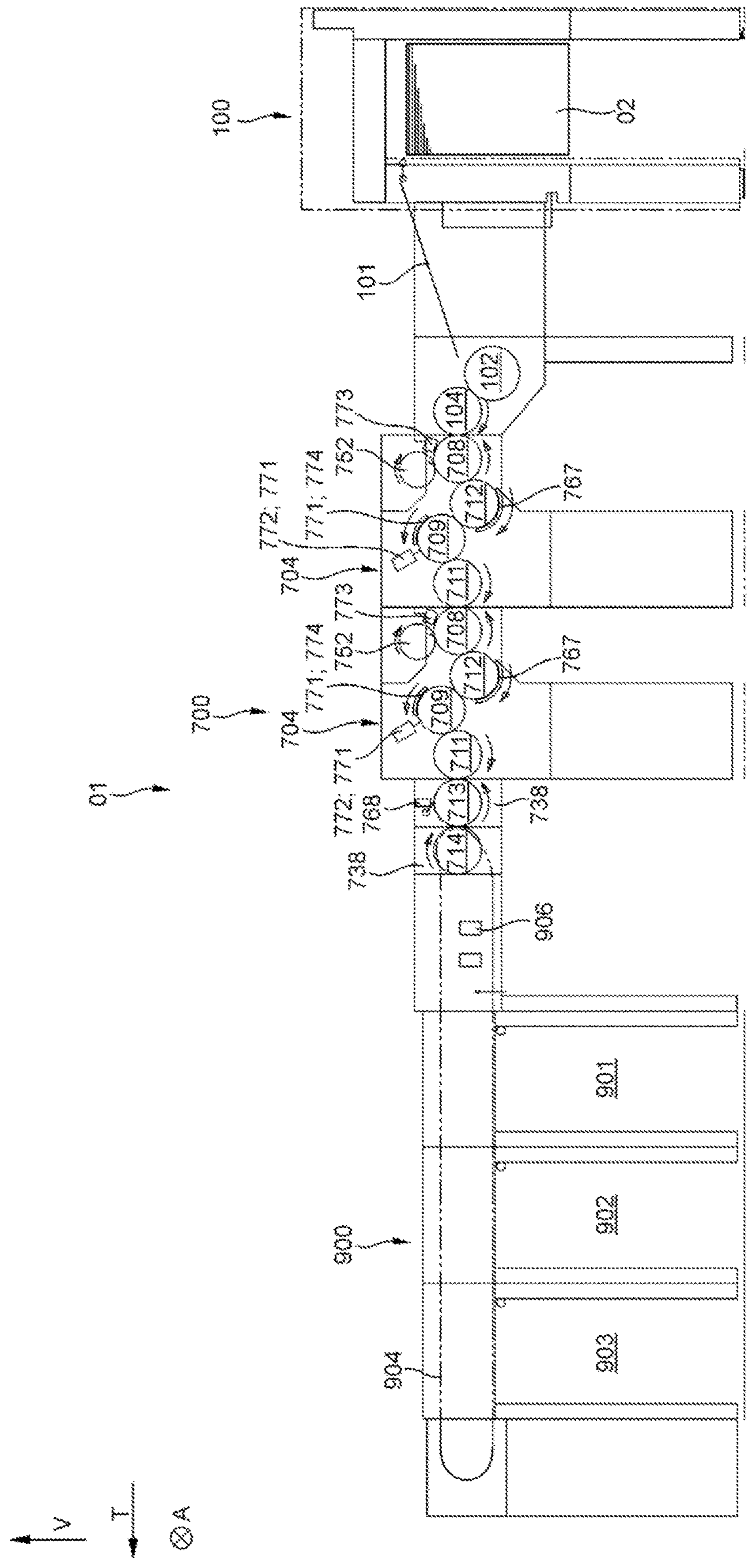
FIG. 3*g* a schematic illustration of a seventh embodiment of a sheet-fed printing press comprising a screen printing unit including two base modules.

Preferably, a respective screen printing forme cylinder 752 is arranged so as to cooperate with each impression cylinder 708. Preferably, a respective pre-alignment device 767 is arranged so as to cooperate with each blower drum 712. A respective drying device 772 or curing device 772 and/or an outer magnetic device 774 are preferably arranged so as to cooperate with each alignment cylinder 709. Preferably, an inspection device 768 is arranged so as to cooperate with the suction drum 713. This seventh exemplary embodiment of a screen printing unit 700 allows a first printing of a front side of sheets 02, a subsequent alignment of particles applied in the process, a subsequent second printing of the front side of the sheets 02, a subsequent alignment of particles applied in the process and a subsequent inspection of the front side of the sheets 02. A sheet feeder 100 is arranged upstream from the screen printing unit 700, for example, in particular in such a way that its receiving drum 104, together with the impression cylinder 708 of the first base module 704, forms its first transfer point 731. A sheet delivery 900 is arranged downstream from the screen printing unit 700, for example, in particular in such a way that the sprocket wheel shaft 714 is integrated into the sheet conveyor system 904 of the sheet delivery 900. (A sheet-fed printing press comprising such a screen printing unit 700 is shown schematically in FIG. 3*g* by way of example.)

Figure 3H:
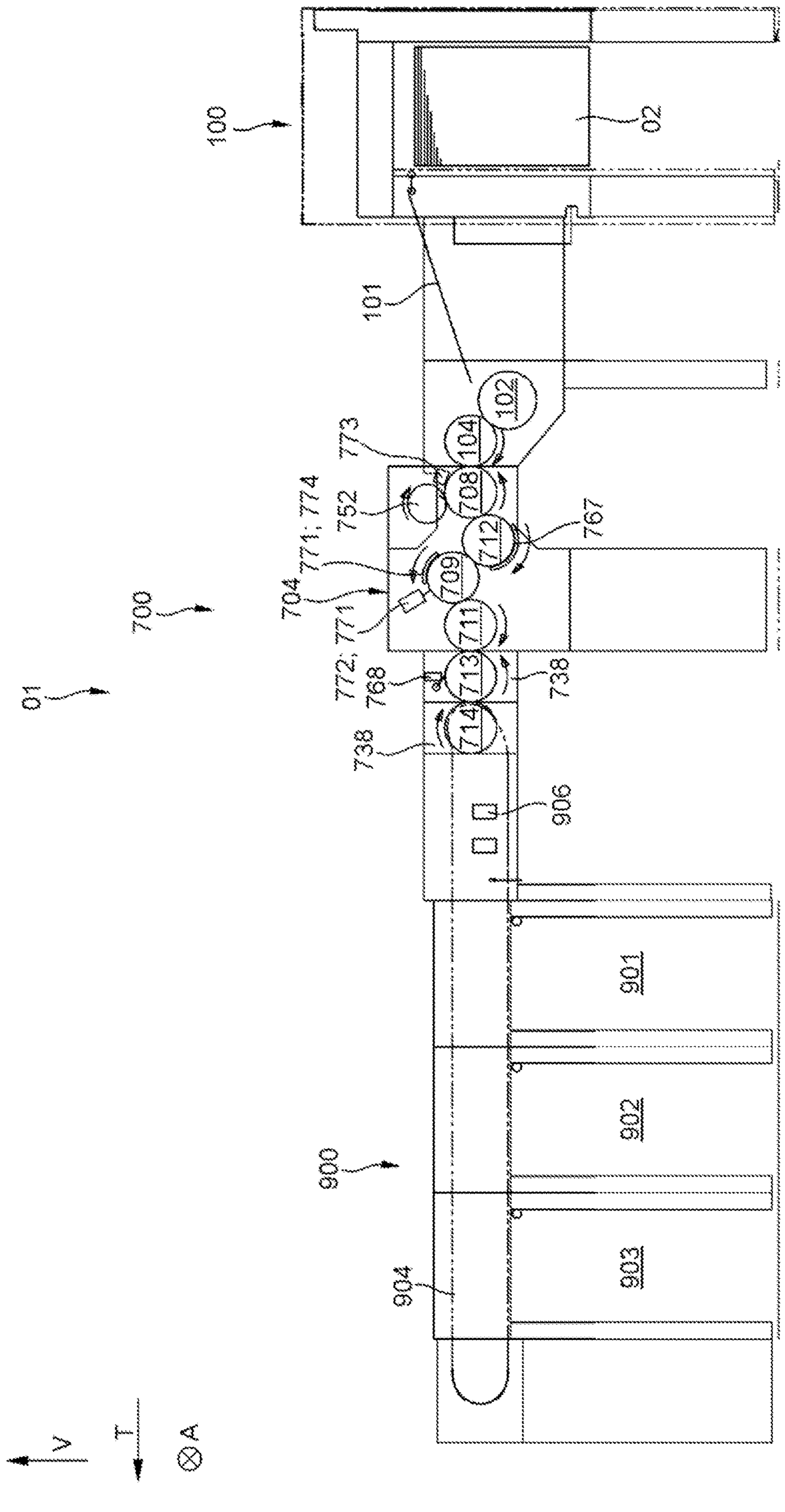
FIG. 3*h* a schematic illustration of an eighth embodiment of a sheet-fed printing press comprising a screen printing unit including one base module.

An eighth exemplary embodiment of such a screen printing unit 700 comprises one base module 704. The base module 704 comprises an impression cylinder 708 in its first installation area 726, a blower drum 712 in its second installation area 727, an in particular first alignment cylinder 709 in its third installation area 728 and a transfer drum 711 in its fourth installation area 729. Subsequent thereto, a suction drum 713 and a sprocket wheel shaft 714 are consecutively arranged in one or more intermediate frames 738. Preferably, a screen printing forme cylinder 752 is arranged so as to cooperate with the impression cylinder 708. A pre-alignment device 767 is preferably arranged so as to cooperate with the blower drum 712. A drying device 772 or curing device 772 and/or an outer magnetic device 774 are preferably arranged so as to cooperate with the alignment cylinder 709. Preferably, an inspection device 768 is arranged so as to cooperate with the suction drum 713. This eighth exemplary embodiment of a screen printing unit 700 allows a printing of a front side of sheets 02, a subsequent alignment of particles applied in the process, and a subsequent inspection of the front side of the sheets 02. A sheet feeder 100 is arranged upstream from the screen printing unit 700, for example, in particular in such a way that its receiving drum 104, together with the impression cylinder 708 of the first base module 704, forms its first transfer point 731. A sheet delivery 900 is arranged downstream from the screen printing unit 700, for example, in particular in such a way that the sprocket wheel shaft 714 is integrated into the sheet conveyor system 904 of the sheet delivery 900. (A sheet-fed printing press comprising such a screen printing unit 700 is shown schematically in FIG. 3*h* by way of example.)

Figure 3I:
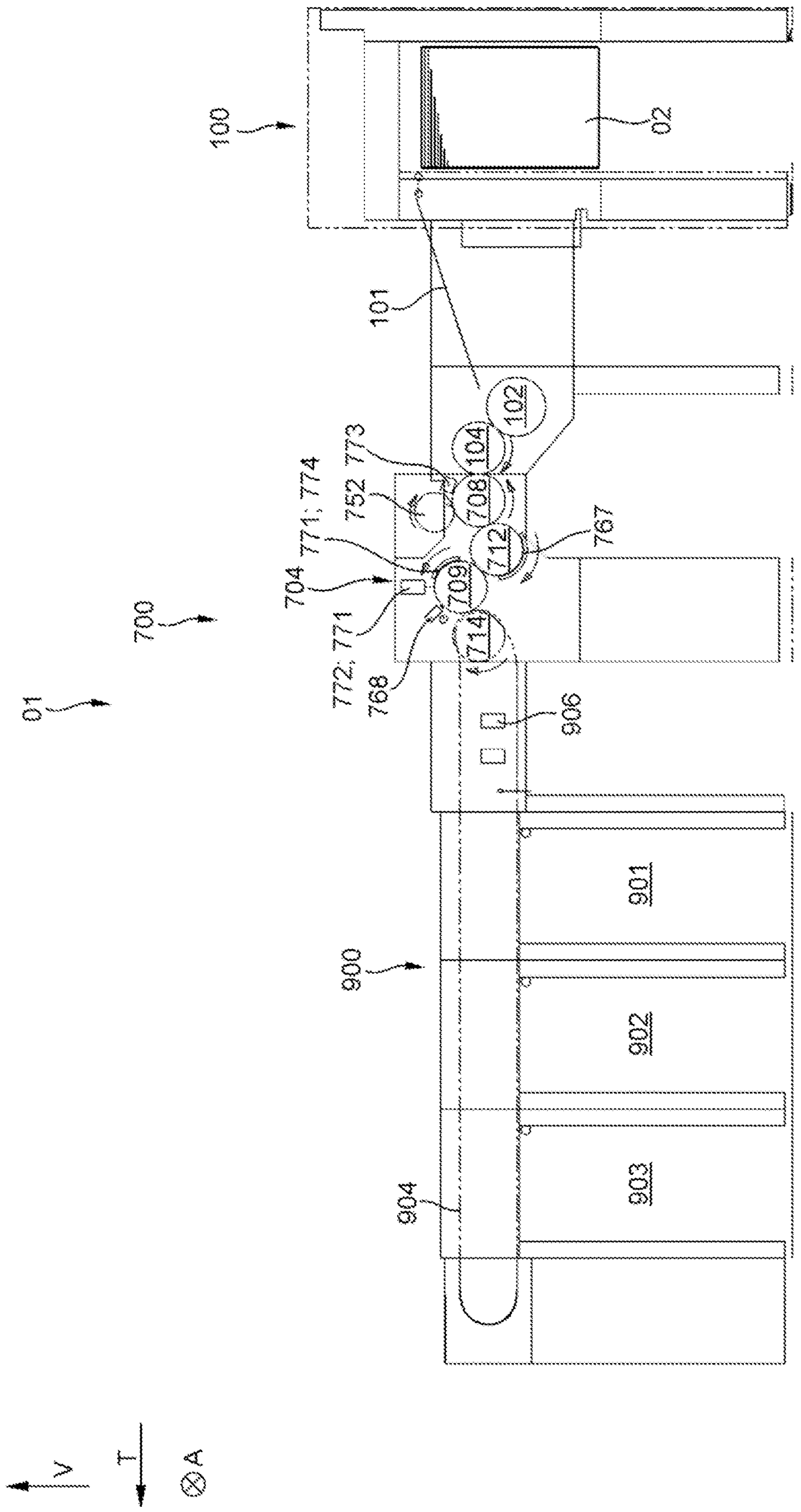
FIG. 3*i* a schematic illustration of a ninth embodiment of a sheet-fed printing press comprising a screen printing unit including one base module.
Figure 4:
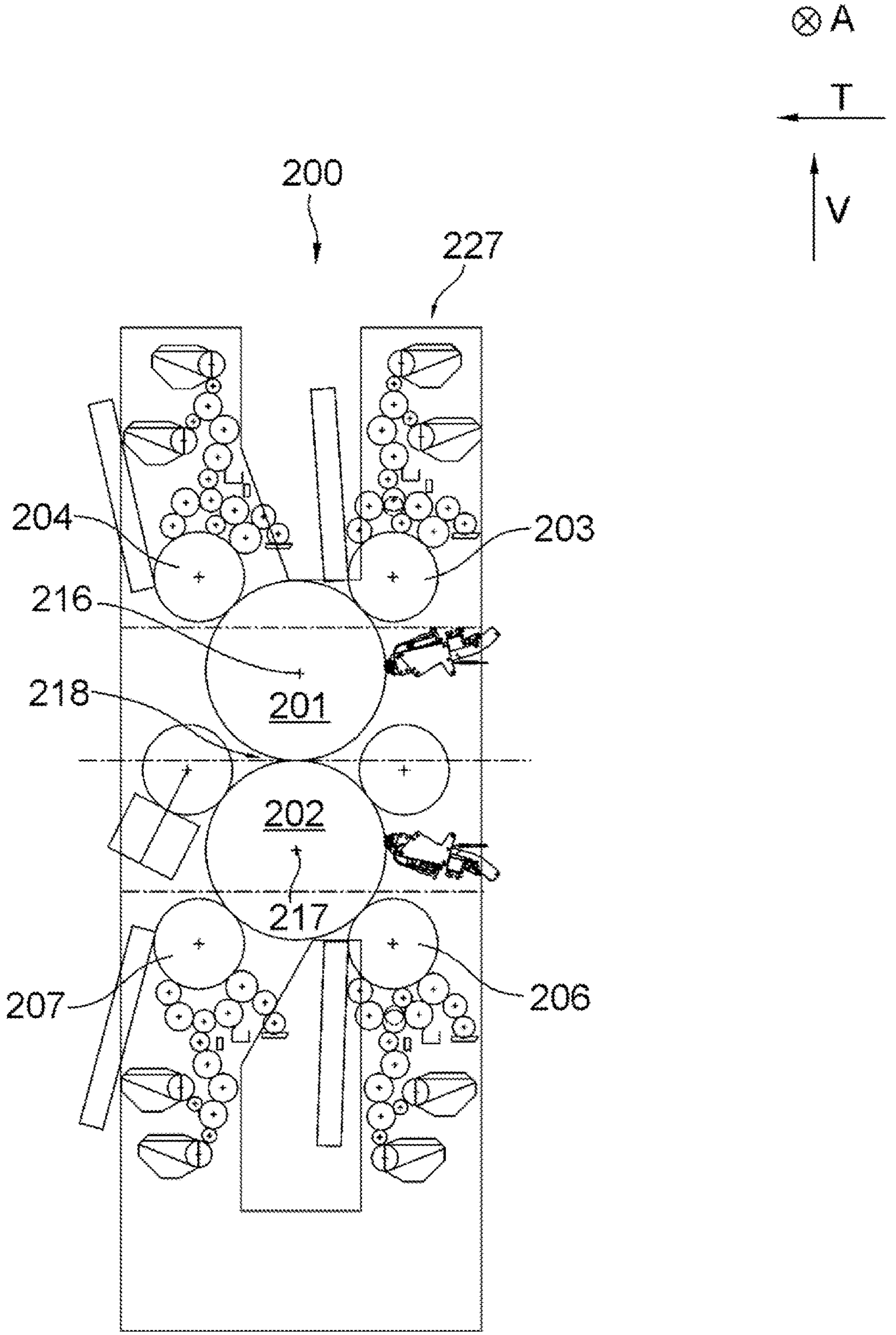
FIG. 4 a schematic illustration of a simultaneous double printing unit.
Figure 6:
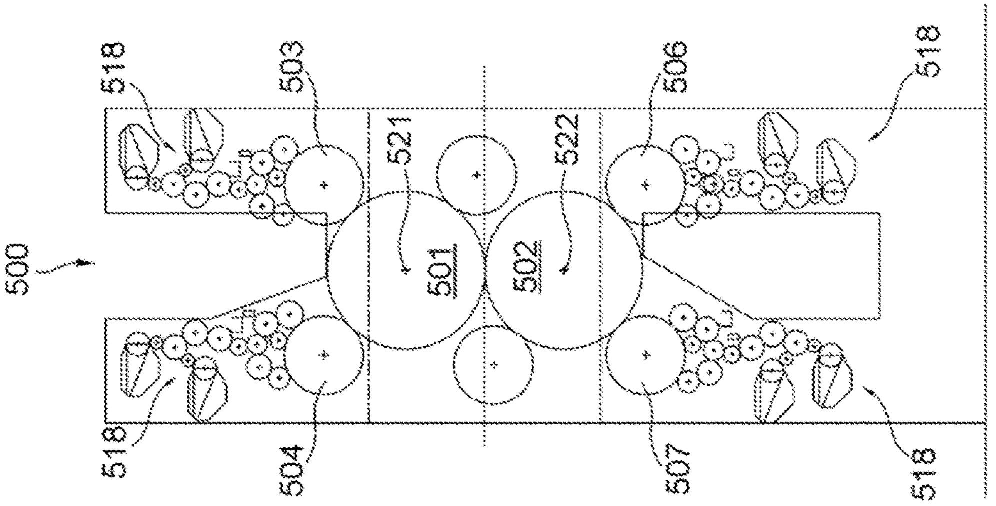
FIG. 6 a schematic illustration of a sheet numbering printing unit.
Figure 5:
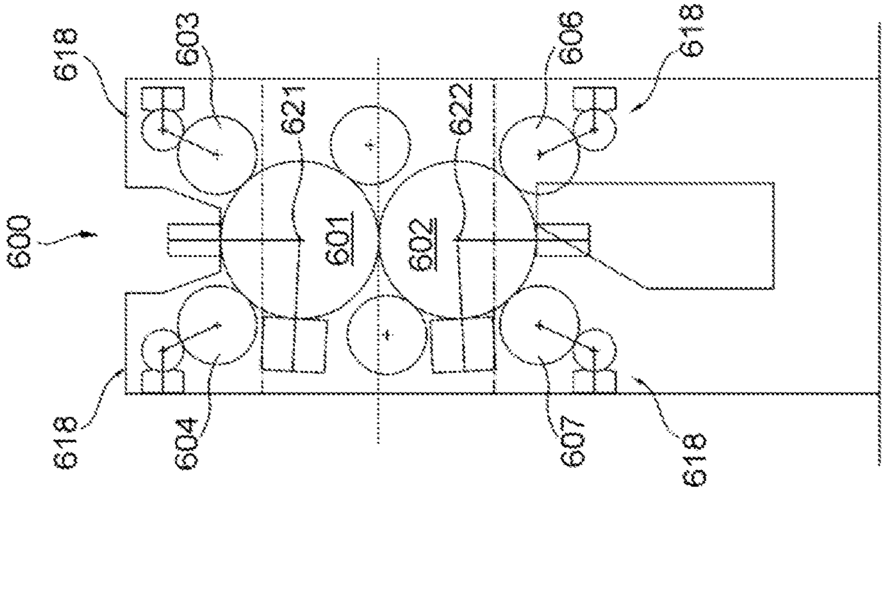
FIG. 5 a schematic illustration of a flexographic printing unit.

A ninth exemplary embodiment of such a screen printing unit 700 comprises one base module 704. The base module 704 comprises an impression cylinder 708 in its first installation area 726, a blower drum 712 in its second installation area 727, an in particular first alignment cylinder 709 in its third installation area 728 and a sprocket wheel shaft 714 in its fourth installation area 729. The alignment cylinder 709 preferably comprises suction devices. Preferably, a screen printing forme cylinder 752 is arranged so as to cooperate with the impression cylinder 708. A pre-alignment device 767 is preferably arranged so as to cooperate with the blower drum 712. A drying device 772 or curing device 772 and/or an outer magnetic device 774 as well as an inspection device 768 are preferably arranged so as to cooperate with the alignment cylinder 709. This ninth exemplary embodiment of a screen printing unit 700 allows a printing of a front side of sheets 02, a subsequent alignment of particles applied in the process, and a subsequent inspection of the front side of the sheets 02. It preferably offers the same functionality as the eighth exemplary embodiment, however has a lower space requirement. A sheet feeder 100 is arranged upstream from the screen printing unit 700, for example, in particular in such a way that its receiving drum 104, together with the impression cylinder 708 of the first base module 704, forms its first transfer point 731. A sheet delivery 900 is arranged downstream from the screen printing unit 700, for example, in particular in such a way that the sprocket wheel shaft 714 is integrated into the sheet conveyor system 904 of the sheet delivery 900. (A sheet-fed printing press comprising such a screen printing unit 700 is shown schematically in FIG. 3*i* by way of example.)

In an additional or alternative refinement, the sheet processing machine 01 preferably additionally comprises at least one further printing unit 200; 500; 600, which more preferably is configured as a sheet simultaneous printing unit 200 and/or which is configured as a sheet numbering printing unit 500 and/or which is configured as a flexographic printing unit 600. Preferably, at least one fixing element, which is in particular provided for holding sheets 02, of at least one, and preferably each, sheet transport cylinder 201; 202; 501; 502; 601; 602 of this at least one further printing unit 200; 500; 600 has an inner contact surface and an outer contact surface, which are arranged so as to cooperate for clamping sheets 02. This inner contact surface is preferably located at least partially at a distance from an axis of rotation 216; 217; 521; 522; 621; 622 of this sheet transport cylinder 201; 202; 501; 502; 601; 602 which corresponds to the base radius R0 or an integer multiple of the base radius R0, and in particular twice the base radius R0.

In an additional or alternative refinement, the sheet processing machine 01 preferably comprises at least one sheet-fed printing unit 200 configured for a simultaneous printing process. Such a sheet-fed printing unit 200 is also referred to as a sheet simultaneous printing unit 200 or sheet collect printing unit 200. The simultaneous printing process is in particular characterized in that printing ink stemming from different forme cylinders 203; 204; 206; 207 is first collected on a collect cylinder 201; 202, which is preferably configured as a transfer cylinder 201; 202, and is then transferred concomitantly, i.e., simultaneously onto a respective sheet 02. This transfer preferably takes place directly from the collect cylinder 202, which is then preferably also configured as a transfer cylinder 201; 202. The respective transfer cylinder 201; 202 preferably cooperates with a respective impression cylinder 201; 202. Preferably, in each case a transfer cylinder 201; 202 and an impression cylinder 201; 202 together form a printing nip 218, wherein the sheets 02 are preferably transported through this printing nip 218 and/or wherein the sheets 02 are preferably provided in this printing nip 218 with printing ink, and in particular with the collected printing inks. Preferably, two cylinders 201; 202 cooperate in such a way that each is configured as a transfer cylinder 201; 202 and at the same time acts as an impression cylinder 201; 202 for the respective other of these two cylinders 201; 202. The sheet simultaneous printing unit 200 is then, for example, also referred to as a simultaneous blanket-to-blanket printing unit 200 and is used in particular for simultaneously printing a respective sheet 02 on two sides. Preferably, only one of these collect cylinders 201; 202 is configured as a sheet transport cylinder 201; 202.

The at least one sheet simultaneous printing unit 200 comprises at least two forme cylinders 203; 204; 206; 207. Each respective forme cylinder 203; 204; 206; 207 is preferably arranged so as to be directly in contact with a respective impression cylinder 201; 202 and/or so as to directly cooperate and/or be capable of directly cooperating therewith. The sheet simultaneous printing unit 200 preferably comprises four forme cylinders 203; 204; 206; 207, of which more preferably two are directly in contact with an in particular first shared collect cylinder 201; 202 and/or are arranged so as to directly cooperate and/or be capable of directly cooperating therewith, and of which more preferably two other are directly in contact with the other, in particular second shared, collect cylinder 201; 202 and/or are arranged so as to directly cooperate and/or be capable of directly cooperating therewith.

Different printing formes, in particular printing plates, can be arranged on the respective forme cylinder 203; 204; 206; 207 of the sheet simultaneous printing unit, for example as a function of the print image to be printed. For example, at least one planographic printing forme can be arranged on the respective forme cylinder 203; 204; 206; 207. As an alternative or in addition, for example, at least one letterset printing forme can be arranged on the respective forme cylinder 203; 204; 206; 207. A letterset printing forme has only a relatively low height of the ink-transferring areas compared to the remaining printing plate and, in terms of its operating principle, is comparable to a letterpress forme. Preferably, at least one inking unit 227 is provided per forme cylinder 203; 204; 206; 207.

In an alternative or additional refinement, the sheet simultaneous printing unit 200 is preferably characterized in that the printing unit comprises a first collect cylinder 201 and a second collect cylinder 202, which are directly in contact with one another and/or are arranged so as to directly cooperate with one another, and which each have an axis of rotation 216; 217, and that an axial plane E1 is a plane E1 that includes both the axis of rotation 216 of the first collect cylinder 201 and the axis of rotation 217 of the second collect cylinder 202, and that a reference plane E2 is a plane E2 that includes at least one axis of rotation 216; 217 of such a collect cylinder 201; 202 and has a horizontal surface normal. These two collect cylinders 201; 202 are preferably arranged, at least during a processing operation, and in particular a printing operation, in such a way that the angle of intersection between the axial plane E1 on the one hand and the reference plane E2 on the other hand is no more than 45°, more preferably no more than 30°, still more preferably no more than 15°, still more preferably no more than 10°, still more preferably no more than 5°, still more preferably no more than 2°, still more preferably no more than 1°, still more preferably no more than 0.5°, and still more preferably exactly 0°.

A fixing element, which is in particular provided for holding sheets 02, of the collect cylinder 201; 202, configured as a sheet transport cylinder 201; 202, preferably has an inner contact surface and an outer contact surface, which are arranged so as to cooperate for clamping sheets 02. This inner contact surface is located at least partially at a distance from an axis of rotation 216; 217 of this collect cylinder 201; 202, configured as a sheet transport cylinder 201; 202, which corresponds to the base radius R0 or an integer multiple of the base radius R0, and in particular twice the base radius R0.

In an additional or alternative refinement, the sheet processing machine 01 preferably comprises at least one sheet-fed printing unit 500 configured for a letterpress process. Such a sheet-fed printing unit 500 is also referred to as a letterpress printing unit 500. The letterpress process is used, for example, as a numbering printing method. Hereafter, comments are made with regard to a sheet numbering printing unit 500 which, however, also apply accordingly to general letterpress processes. In an additional or alternative refinement, the sheet processing machine 01 preferably comprises at least one sheet-fed printing unit 500 configured for a numbering printing process. Such a sheet-fed printing unit 500 is also referred to as a sheet numbering printing unit 500. The sheet numbering printing unit 500 preferably comprises at least one impression cylinder 501; 502, which is preferably configured as a respective sheet transport cylinder 501; 502. For example, the sheet numbering printing unit 500 comprises two cylinders 501; 502 of a first type, which more preferably are configured as respective impression cylinders 501; 502 and/or as respective sheet transport cylinders 501; 502 and/or which are directly in contact with one another and/or are arranged so as to directly cooperate and/or be capable of directly cooperating with one another.

A respective numbering of the sheets 02 and/or of the multiple-up copies of the sheets 02 in particular embodied as securities preferably takes place by means of a letterpress process, in particular using at least one numbering forme cylinder 503; 504; 506; 507, which more preferably comprises at least one numbering unit. Preferably, individual numbering units are employed, of which more preferably multiple are arranged on a shared numbering forme cylinder 503; 504; 506; 507. The respective numbering forme cylinder 503; 504; 506; 507 preferably comprises multiple numbering units, which in its circumferential direction are arranged one behind the other on the respective numbering forme cylinder 503; 504; 506; 507, for example at least two or at least four or at least eight or at least twelve, and/or the respective numbering forme cylinder 503; 504; 506; 507 comprises multiple numbering units, which are arranged next to one another in the transverse direction A on the respective numbering forme cylinder 503; 504; 506; 507. The respective at least one numbering unit comprises, for example, a counting unit including multiple symbol rolls, wherein the symbol rolls in each case include set-apart, in particular raised areas in the form of symbols, such as for example numbers and/or letters. Depending on the position of a respective symbol roll, a different symbol is located on the outside, in particular on the outside based on an axis of rotation of respective numbering forme cylinder 503; 504; 506; 507. Depending on the relative positions of the individual symbol rolls, the outer symbols of the counting unit collectively preferably yield an unambiguous serial number. Preferably, at least one inking unit 518 is provided per numbering forme cylinder 503; 504; 506; 507. Upon contact, the at least one inking unit 518 preferably provides the respective outer symbols of the numbering units of this respective numbering forme cylinder 504; 504; 506; 507 with printing ink. The respective numbering forme cylinder 503; 504; 506; 507 is rotated further and comes in contact with the respective sheet 02, transferring the printing ink in the form of the symbol onto the sheet 02. Preferably, the combination of the symbols is changed by the next time this numbering unit makes contact with the inking unit 518 so as to be able to transfer a different marking during the next contact with the corresponding sheet 02.

Each respective numbering forme cylinder 503; 504; 506; 507 is preferably arranged so as to be directly in contact with a respective impression cylinder 501; 502 and/or so as to directly cooperate and/or be capable of directly cooperating therewith. Preferably, impression cylinders 501; 502 of the sheet numbering printing unit 500 are also configured as sheet transport cylinders 501; 502, in particular independently of their number.

The comments made above and/or below regarding the sheet numbering printing unit 500 also apply accordingly, in general terms, to a letterpress printing unit 500, provided this does not result in any contradictions, in particular with the modification that letterpress forme cylinders 503; 504; 506; 507 preferably carry respective inflexible printing formes, and consequently do not carry any numbering units, as is the case instead with the numbering forme cylinders 503; 504; 506; 507.

A fixing element, which is in particular provided for holding sheets 02, of the at least one impression cylinder 501; 502 configured as a sheet transport cylinder 501; 502 preferably has an inner contact surface and an outer contact surface, which are arranged so as to cooperate for clamping sheets 02. This inner contact surface is located at least partially at a distance from an axis of rotation 521; 522 of this sheet transport cylinder 501; 502 which corresponds to the base radius R0 or an integer multiple of the base radius R0, and in particular twice the base radius R0.

In an additional or alternative refinement, the sheet processing machine 01 preferably comprises at least one sheet processing unit 600 and/or sheet-fed printing unit 600 configured for a flexographic printing process. Such a sheet-fed printing unit 600 is also referred to as a flexographic printing unit 600. The flexographic printing method is used, for example, as a coating method, and in particular as a varnishing method. The flexographic printing unit 600 preferably comprises at least one impression cylinder 601; 602, which is more preferably configured as a respective sheet transport cylinder 601; 602. More preferably, the flexographic printing unit 600 comprises two impression cylinders 601; 602, which more preferably are configured as respective sheet transport cylinders 601; 602 and/or which are directly in contact with one another and/or are arranged so as to directly cooperate and/or be capable of directly cooperating with one another. Preferably, impression cylinders 601; 602 of the flexographic printing unit 600 are also configured as sheet transport cylinders 601; 602, in particular independently of their number.

The flexographic printing unit 600 preferably comprises at least one flexographic forme cylinder 603; 604; 606; 607. Preferably, at least one inking unit 618 is provided per flexographic forme cylinder 603; 604; 606; 607. A flexographic forme cylinder 603; 604; 606; 607 shall in particular be understood to mean a forme cylinder 603; 604; 606; 607 provided for a flexographic printing method and/or shall in particular be understood to mean a forme cylinder 603; 604; 606; 607, which is configured to carry at least one preferably exchangeable flexographic printing forme, in particular on its outer cylindrical surface. Each respective flexographic forme cylinder 603; 604; 606; 607 is preferably arranged so as to be directly in contact with a respective impression cylinder 601; 602 and/or so as to directly cooperate and/or be capable of directly cooperating therewith.

A fixing element, which is in particular provided for holding sheets 02, of the at least one impression cylinder 601; 602 configured as a sheet transport cylinder 601; 602 preferably has an inner contact surface and an outer contact surface, which are arranged so as to cooperate for clamping sheets 02. This inner contact surface is located at least partially at a distance from an axis of rotation 621; 622 of this sheet transport cylinder 601; 602 which corresponds to the base radius R0 or an integer multiple of the base radius R0, and in particular twice the base radius R0.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A sheet-fed printing unit (700), the sheet-fed printing unit (700) being configured as a screen printing unit (700) and comprising at least one screen printing forme cylinder (752) and at least one impression cylinder (708) cooperating therewith, and the screen printing unit (700) comprising at least one frame (701), which comprises at least two frame side walls (702; 703) located opposite one another in a transverse direction (A), and the screen printing unit (700) comprising at least one first base module (704) and at least one second base module (704), and each respective base module (704) in each case comprising two stationary base side walls (706; 707), which each have a one-piece design and are each an integral part of a respective frame side wall (702; 703), and the respective base module (704) in each case including four installation areas (726; 727; 728; 729) for rotational transport bodies (708; 709; 711; 712; 713; 714), and a relative position of the four installation areas (726; 727; 728; 729) of the at least one first base module (704) with respect to one another coinciding with a relative position of the four installation areas (726; 727; 728; 729) of the at least one second base module (704), and a respective first installation area (726) along a transport path provided for a transport of sheets (02) and a respective second installation area (727) of the respective base module (704) along this, the transport path forming a respective selection group of the respective base module (704), and the at least one impression cylinder (708) which cooperates with the at least one screen printing forme cylinder (752) being arranged in exactly one of the installation areas (726; 727) of the respective selection group of the at least one first base module (704), and a respective rotational transport body (708; 709; 711; 712; 713; 714) being arranged in each of the at least four installation areas (726; 727; 728; 729) of the at least one first base module (704) and the at least one second base module (704), and a functionally different rotational transport body (708; 709; 711; 712; 713; 714) being arranged in at least one installation area (726; 727; 728; 729) of the at least one first base module (704) than in a corresponding installation area (726; 727; 728; 729), in terms of its installation position, of the at least one second base module (704).

2. The sheet-fed printing unit (700) according to claim 1, characterized in that a functionally different rotational transport body (708; 709; 711; 712; 713; 714) is arranged in a first-occurring installation area (726), along the transport path, of the at least one first base module (704) than in a first-occurring installation area (726), along the transport path, of the at least one second base module (704), and/or that a functionally different rotational transport body (708; 709; 711; 712; 713; 714) is arranged in a second-occurring installation area (727), along the transport path, of the at least one first base module (704) than in a second-occurring installation area (727), along the transport path, of the at least one second base module (704), and/or that a functionally different rotational transport body (708; 709; 711; 712; 713; 714) is arranged in a third-occurring installation area (728), along the transport path, of the at least one first base module (704) than in a third-occurring installation area (728), along the transport path, of the at least one second base module (704), and/or that a functionally different rotational transport body (708; 709; 711; 712; 713; 714) is arranged in a fourth-occurring installation area (729), along the transport path, of the at least one first base module (704) than in a fourth-occurring installation area (729), along the transport path, of the at least one second base module (704).

3. The sheet-fed printing unit (700) according to claim 1, characterized in that one of the at least one impression cylinder (708) cooperating with one of the at least one screen printing forme cylinder (752) is arranged in exactly one of the installation areas (726; 727) of the selection group of the at least one second base module (704).

4. The sheet-fed printing unit (700) according to claim 3, characterized in that one of the at least one impression cylinder (708) is arranged in the at least one first base module (704) in a first-occurring installation area (726), along the transport path, of the at least one first base module (704), and the one of the at least one impression cylinder (708) arranged in the at least one second base module (704) is arranged in a first-occurring installation area (726), along the transport path, of the at least one second base module (704).

5. The sheet-fed printing unit (700) according to claim 3, characterized in that one of the at least one impression cylinder (708) is arranged in the at least one first base module (704) in a first-occurring installation area (726), along the transport path, of the at least one first base module (704), and the one of the at least one impression cylinder (708) arranged in the at least one second base module (704) is arranged in a second-occurring installation area (727), along the transport path, of the at least one second base module (704).

6. The sheet-fed printing unit (700) according to claim 1, characterized in that an alignment cylinder (709) is arranged in one of the four installation areas (726; 727; 728; 729) of the at least one first base module (704), which in a region of an outer circumference of the alignment cylinder (709) comprises a plurality of elements that induce a magnetic field, and/or that the alignment cylinder (709) is arranged in one of the four installation areas (726; 727; 728; 729) of the at least one second base module (704), which in the region of the outer circumference comprises the plurality of elements that induce the magnetic field.

7. The sheet-fed printing unit (700) according to claim 1, characterized in that a blower drum (712) is arranged in one of the four installation areas (726; 727; 728; 729) of the at least one first base module (704) and/or that a blower drum (712) is arranged in one of the four installation areas (726; 727; 728; 729) of the at least one second base module (704).

8. The sheet-fed printing unit (700) according to claim 1, characterized in that a cylinder barrel (741) of the at least one impression cylinder (708) includes a supporting surface (744) for sheets (02), which comprises at least one impression portion (746) having a constant barrel radius (R1) that extends over an angle of at least 170° about an axis of rotation (716) of the at least one impression cylinder (708), and that the at least one screen printing forme cylinder (752) has an effective screen radius (R2) and that the effective screen radius (R2) is smaller than the barrel radius (R1), and that the effective screen radius (R2) is larger than half the barrel radius (R1).

9. The sheet-fed printing unit (700) according to claim 1 characterized in that the sheet-fed printing unit (700) comprises at least one further rotational transport body (709; 711; 712; 713), and that a fixing element (743) of the at least one impression cylinder (708) has an inner contact surface (748) and an outer contact surface (749), which are arranged so as to cooperate for clamping sheets (02), and that the inner contact surface (748) is at least partially located at a distance from an axis of rotation (716) of the at least one impression cylinder (708) which corresponds to a base radius (R0), and that a cylinder barrel (741) of the at least one impression cylinder (708) has a supporting surface (744) for sheets (02) that includes at least one impression portion (746) having a constant barrel radius (R1), which extends over an angle of at least 170° about the axis of rotation (716) of the at least one impression cylinder (708), and that the barrel radius (R1) is larger than the base radius (R0), and that a fixing element of the at least one further rotational transport body (709; 711; 712; 713) has an inner contact surface and an outer contact surface, which are arranged so as to cooperate for clamping sheets (02), and that the inner contact surface is at least partially located at a distance from an axis of rotation (717; 718; 719; 721) of the at least one further rotational transport body (709; 711; 712; 713) which corresponds to the base radius (R0).

10. The sheet-fed printing unit according to claim 9, characterized in that the screen printing unit (700) comprises at least one further rotational transport body (709; 711; 712; 713) forming, together with the at least one impression cylinder (708), a transfer point (731; 732; 733), and that a fixing element of the at least one further rotational transport body (709; 711; 712; 713) has an inner contact surface and an outer contact surface, which are arranged so as to cooperate for clamping sheets (02), and that the inner contact surface is at least partially located at a distance from an axis of rotation (717; 718; 719; 721) of the at least one further rotational transport body (709; 711; 712; 713) which corresponds to the base radius (R0), and that an effective screen radius (R2) is smaller than the base radius (R0), and that the effective screen radius (R2) is larger than half the base radius (R0).

11. A sheet-fed printing press (01), the sheet-fed printing press (01) comprising at least one of the sheet-fed printing unit (700) according to claim 1, characterized in that the sheet-fed printing press (01) additionally comprises at least one further printing unit (200; 500; 600), which is configured as a sheet simultaneous printing unit (200) and/or which is configured as a sheet numbering printing unit (500) and/or which is configured as a flexographic printing unit (600).

12. The sheet-fed printing press according to claim 11, characterized in that a fixing element (743) of a respective impression cylinder (708) has an inner contact surface (748) and an outer contact surface (749), which are arranged so as to cooperate for clamping sheets (02), and that the inner contact surface (748) is located at least partially at a distance from an axis of rotation (716) of the respective impression cylinder (708) which corresponds to a base radius (R0), and that a barrel radius (R1) of the respective impression cylinder (708) is greater than the base radius (R0), and that at least one fixing element of at least one sheet transport cylinder (201; 202; 501; 502; 601; 602) of the at least one further printing unit (200; 500; 600) has an inner contact surface and an outer contact surface, which are arranged so as to cooperate for clamping sheets (02), and that the inner contact surface is located at least partially at a distance from an axis of rotation (216; 217; 516; 517; 616; 617) of the sheet transport cylinder (201; 202; 501; 502; 601; 602) which corresponds to the base radius (R0) or an integer multiple of the base radius (R0) that is inclusive of twice the base radius (R0).

* * * * *